(12) United States Patent
Zhang et al.

(10) Patent No.: US 11,270,455 B2
(45) Date of Patent: Mar. 8, 2022

(54) METHOD AND APPARATUS FOR POSE PROCESSING

(71) Applicant: SAMSUNG ELECTRONICS CO., LTD., Suwon-si (KR)

(72) Inventors: Weihua Zhang, Beijing (CN); Zhenbo Luo, Beijing (CN); Yingying Jiang, Beijing (CN); Xiangyu Zhu, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 83 days.

(21) Appl. No.: 16/409,078

(22) Filed: May 10, 2019

(65) Prior Publication Data

US 2019/0347826 A1 Nov. 14, 2019

(30) Foreign Application Priority Data

May 11, 2018 (CN) .......................... 201810450419.5
Jul. 25, 2018 (CN) .......................... 201810827948.2

(51) Int. Cl.
| | |
|---|---|
| G06T 7/70 | (2017.01) |
| G06T 7/73 | (2017.01) |
| G06K 9/00 | (2022.01) |
| G06N 3/08 | (2006.01) |
| G06K 9/46 | (2006.01) |

(52) U.S. Cl.
CPC ............ *G06T 7/73* (2017.01); *G06K 9/00342* (2013.01); *G06K 9/00369* (2013.01); *G06K 9/4604* (2013.01); *G06N 3/08* (2013.01)

(58) Field of Classification Search
CPC ... G06T 7/73; G06T 2207/20084; G06T 7/75; G06T 2207/30196; G06K 9/00369; G06K 9/4604; G06K 9/00342; G06K 9/44; G06K 9/6273; G06N 3/08; G06N 3/082; G06N 3/0454
See application file for complete search history.

(56) References Cited

U.S. PATENT DOCUMENTS

| | | | |
|---|---|---|---|
| 7,308,332 B2 | 12/2007 | Okada et al. | |
| 7,317,836 B2 * | 1/2008 | Fujimura | ........... G06K 9/00362 382/154 |

(Continued)

FOREIGN PATENT DOCUMENTS

| | | |
|---|---|---|
| JP | 4647289 B2 | 3/2011 |
| KR | 10-1758064 B1 | 7/2017 |

OTHER PUBLICATIONS

Communication dated Aug. 8, 2019 issued by the International Searching Authority in counterpart Application No. PCT/KR2019/005234 (PCT/ISA/220, PCT/ISA/210, and PCT/ISA/237).
Guler, R., et al., "DensePose: Dense Human Pose Estimation In The Wild", Feb. 1, 2018, arXiv:1802.00434v1 [cs.CV], 12 pages total.
Cao, Z., et al., "Realtime Multi-Person 2D Pose Estimation using Part Affinity Fields", Apr. 14, 2017, arXiv:1611.08050v2 [cs.CV], 9 pages total.

(Continued)

*Primary Examiner* — Neil R McLean
(74) *Attorney, Agent, or Firm* — Sughrue Mion, PLLC

(57) ABSTRACT

Provided is a method for pose estimation in a device, the method comprising capturing an image; estimating poses of an object included in the captured image; obtaining skeleton information of the object based on the estimating of the poses of the object; and processing the skeleton information of the object for at least one of detecting blocking of the object, detecting the poses of the object and adjusting content based on detected virtual object distinct from human body poses.

21 Claims, 21 Drawing Sheets

(56) References Cited

U.S. PATENT DOCUMENTS

| | | | |
|---|---|---|---|
| 7,848,545 B2 | 12/2010 | Kameyama | |
| 8,437,506 B2* | 5/2013 | Williams | G06F 3/011 382/103 |
| 8,830,236 B2 | 9/2014 | Germann et al. | |
| 9,036,069 B2 | 5/2015 | Wu et al. | |
| 9,098,766 B2 | 8/2015 | Dariush et al. | |
| 9,165,199 B2 | 10/2015 | Zhu et al. | |
| 9,449,392 B2 | 9/2016 | Han et al. | |
| 9,560,266 B2 | 1/2017 | Kimura | |
| 2009/0175540 A1* | 7/2009 | Dariush | G06K 9/00362 382/195 |
| 2010/0266206 A1* | 10/2010 | Jo | G06K 9/00261 382/190 |
| 2015/0215528 A1* | 7/2015 | Wu | H04N 5/23222 348/207.1 |
| 2016/0050363 A1* | 2/2016 | Stubler | G06K 9/52 348/222.1 |
| 2018/0075290 A1* | 3/2018 | Chen | G06K 9/00248 |
| 2018/0357472 A1* | 12/2018 | Dreessen | G06T 3/60 |

OTHER PUBLICATIONS

Zhu, X., et al., "Multi-Person Pose Estimation for PoseTrack with Enhanced Part Affinity Fields", Oct. 23, 2017, ICCV2017 PoseTrack Challenge workshop, 4 pages total.

Matteo Fabbri et al., "Learning to Detect and Track Visible and Occluded Body Joints in a Virtual World" arxiv.org, Mar. 22, 2018, downloaded arXiv:1803.08319v2 [cs.CV], Mar. 23, 2018, XP080861903. (21 pages total).

Qingfu Wan et al., "DeepSkeleton: Skeleton Map for 3D Human Pose Regression", arxiv.org, Cornell University Library, Nov. 29, 2017, XP081298151. (11 pages total).

Chi-Jui Wu et al., "Out of sight: a toolkit for tracking occluded human joint positions", Personal and Ubiquitous Computing, Dec. 2, 2016, vol. 21, No. 1, pp. 125-135, XP036139032. (11 pages total).

Communication dated Apr. 22, 2021 by the European Patent Office in counterpart European Patent Application No. 19799275.3.

* cited by examiner

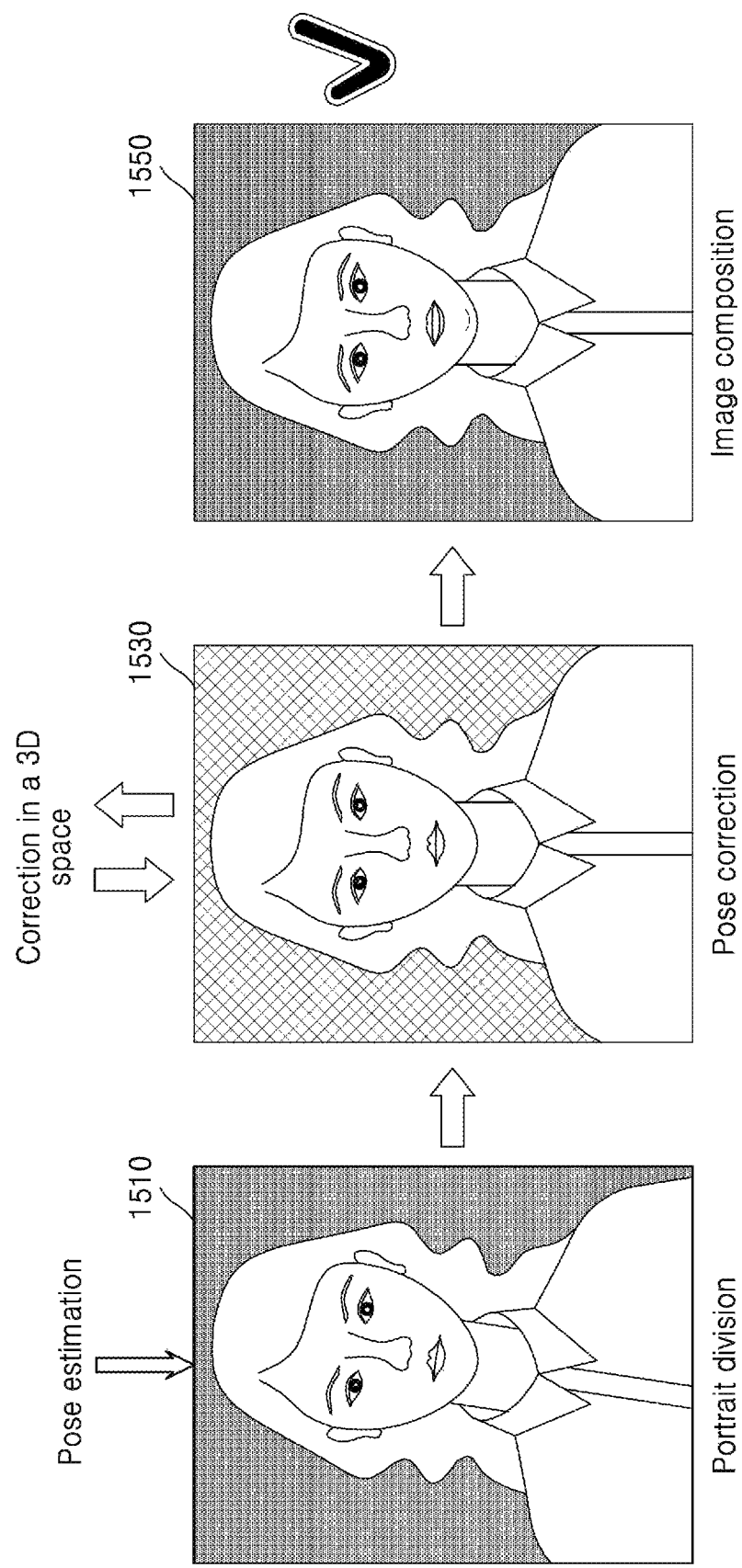

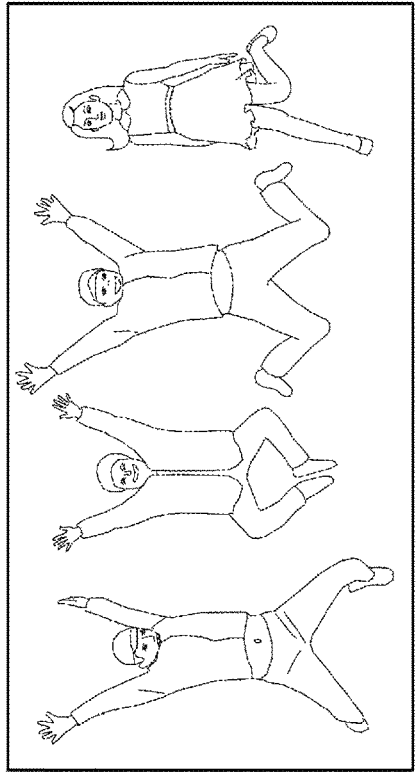
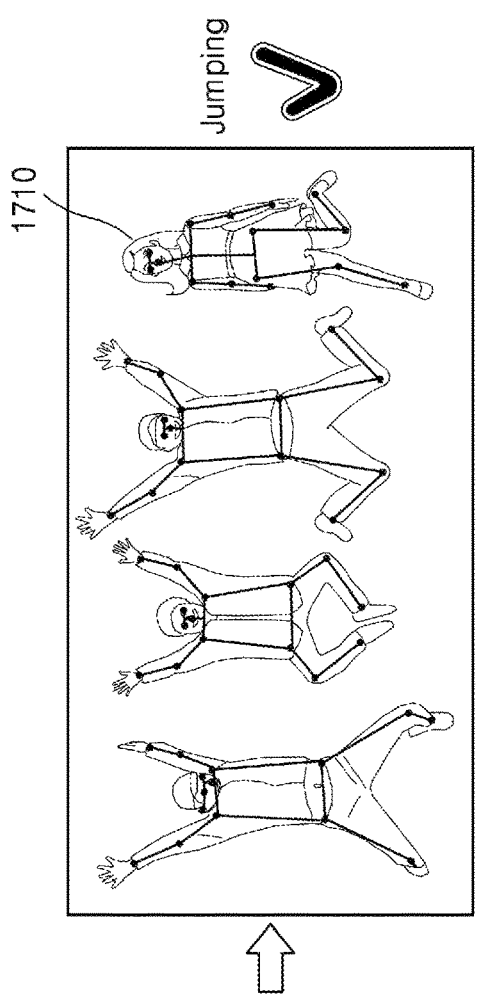
FIG. 17A
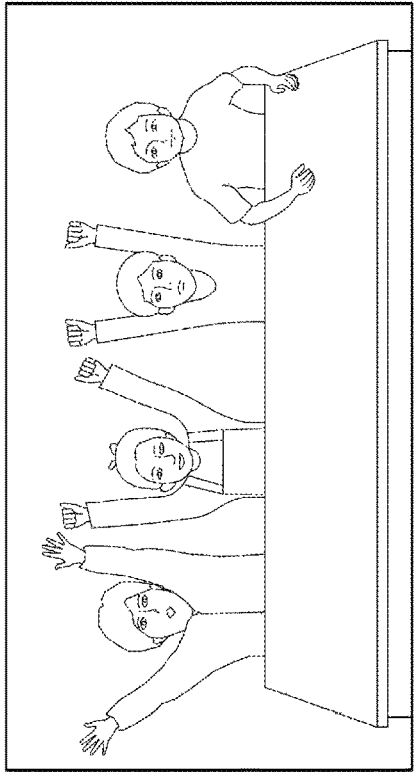
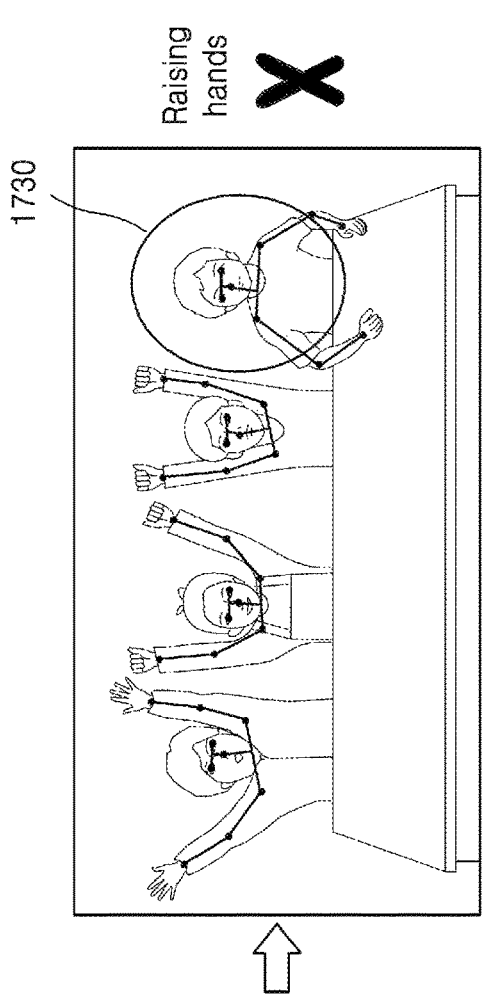
FIG. 17B

FIG. 21
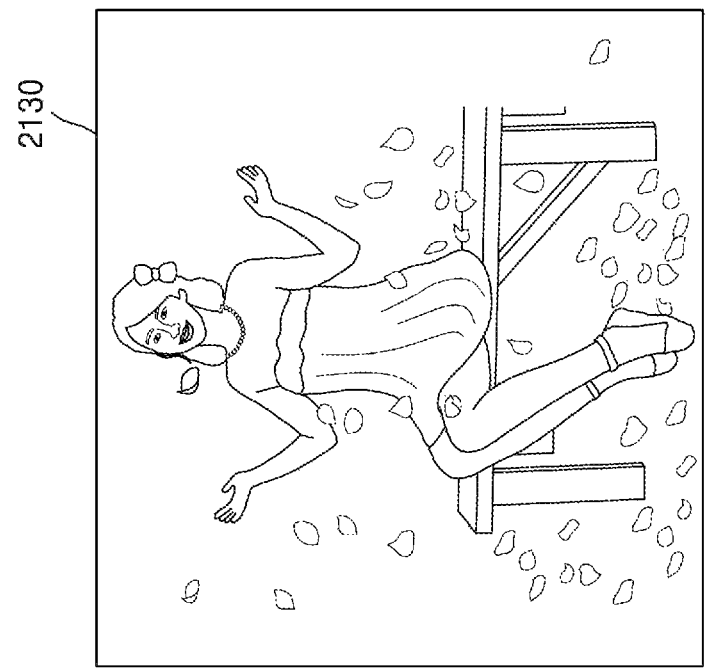
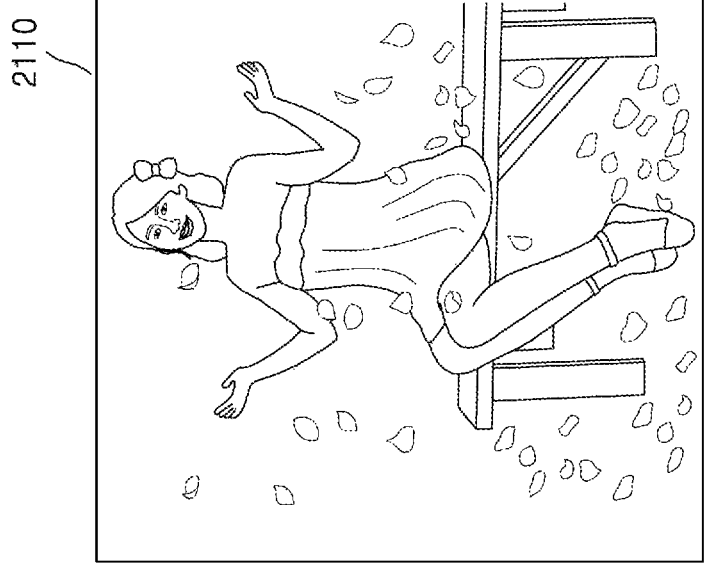
Add ornaments(necklaces, bracelets, etc.)

METHOD AND APPARATUS FOR POSE PROCESSING

This application is based on and claims priority under 35 U.S.C. § 119 to a Chinese Patent Application No. 201810450419.5, filed on May 11, 2018 and a Chinese Patent Application No. 201810827948.2, filed on Jul. 25, 2018 in the China National Intellectual Property Administration, the disclosure of each of which is herein incorporated by reference in its entirety.

BACKGROUND

1. Field

The disclosure relates to computer vision and artificial intelligence. More particularly, the disclosure relates to a method and an apparatus for estimating a pose based on pose estimation.

2. Description of Related Art

Machines in the field of computer vision may understand multimedia information, especially information related to human beings, at a higher level by deep learning such as face recognition and pedestrian recognition. However, most of the present technologies focus on the face recognition only, and the technologies for the body or human pose recognition is still underdeveloped. Due to the lack of high-performance algorithms for the human pose estimation suitable for terminal devices, lots of embodiments based on human pose recognition cannot be implemented.

Hence, the existing human pose estimation algorithms cannot be implemented on devices with limited computing capacity, such as terminal devices, and cannot support applications taking the algorithm as the core. Even if the algorithms may be implemented on some terminal devices with limited computing capacity, the algorithm fails to satisfy the high level of requirements in applications due to low accuracy of pose estimation.

SUMMARY

According to an aspect of the disclosure, there is a method for pose estimation in a device, the method including: digitally capturing an image; estimating poses of an object included in the digitally captured image; obtaining skeleton information of the object based on the estimating of the poses of the object; and processing the skeleton information of the object for at least one of detecting blocking of the object, detecting the poses of the object and adjusting content based on detected virtual object distinct from human body pose.

According to another aspect of the disclosure, there is an apparatus for estimating a pose of an object, the apparatus including: a camera for capturing an image; and a processor configured to: estimate poses of an object included in the captured image, obtain skeleton information of the object based on the estimating of the poses of the object, and process the skeleton information of the object for at least one of detecting blocking of the object, detecting the poses of the object and adjusting content based on detected virtual object distinct from human body poses.

According to an aspect of the disclosure, provided is a method for pose estimation in a device, the method including capturing an image; estimating poses of an object included in the captured image; obtaining skeleton information of the object based on the estimating of the poses of the object; and processing the skeleton information of the object for at least one of detecting occlusion of the object, detecting the poses of the object and adjusting content based on detected virtual object distinct from human body poses.

According to an aspect of the disclosure, the capturing of the image includes capturing the image in a preview state.

According to an aspect of the disclosure, the estimating of the poses of the object includes extracting features from the captured image; detecting, based on the extracted features, key point information of the object; and constructing the skeleton information of the object based on the key point information.

According to an aspect of the disclosure, the detecting of the occlusion of the object includes determining, according to bone nodes corresponding to the object, at least one missing skeleton part based on the skeleton information; and obtaining the at least one missing skeleton part, wherein each of the at least one missing skeleton part corresponds to each of bone nodes.

According to an aspect of the disclosure, the determining of the at least one missing skeleton part includes determining, according to the number of bone nodes corresponding to the object, the occlusion of the object.

According to an aspect of the disclosure, the method further includes outputting an occlusion notification based on the detecting of the occlusion.

According to an aspect of the disclosure, the outputting of the occlusion notification includes outputting the occlusion notification when the number of the at least one missing skeleton part exceeds a predetermined number.

According to an aspect of the disclosure, the detecting of the poses of the object includes detecting the poses of the object based on a positional relation between bone nodes in included in the skeleton information.

According to an aspect of the disclosure, the method further includes outputting, based on the detecting of the poses of the object, a pose correction notification.

According to an aspect of the disclosure, the detecting of the poses of the object includes detecting poses inconsistency based on the skeleton information of the object; and outputting, based on the detecting of the poses inconsistency, a pose inconsistency notification.

According to an aspect of the disclosure, the detecting of the poses inconsistency includes obtaining bone node vectors of the object and a second object, respectively; determining a degree of a pose similarity between the bone node vectors of the object and the second object; and detecting the pose inconsistency between the object and the second object based on the degree of the pose similarity between the bone node vectors of the object and the second object.

According to an aspect of the disclosure, the detecting of the poses inconsistency further includes adjusting the poses of object to poses of the second object based on the detecting of the poses inconsistency.

According to an aspect of the disclosure, the adjusting of the content includes performing at least one of content replacement, content adding, content deletion and content adjustment based on the detected virtual object.

According to another aspect of the disclosure, provided is method for estimating a pose of an object, the method including extracting, by a feature extraction neural network, features from an image containing the object; detecting, by a backend prediction neural network, key point information of the object based on the features; and constructing skeleton information of the object based on the key point information.

According to an aspect of the disclosure, the number of convolution layers included in at least one bottleneck unit in the feature extraction neural network is less than a predetermined number of second target convolution layers, the number of Batch Normalization (BN) layers in the at least one bottleneck unit is less than a predetermined number of target BN layers, or no predetermined convolution layer is included in the at least one bottleneck unit.

According to an aspect of the disclosure, the key point information of the object includes bone node information and bone node vector information of the object, and the detecting of the key point information includes detecting, by the backend prediction neural network, combining the bone node information and the bone node vector information of the object.

According to an aspect of the disclosure, the number of channels of the backend prediction neural network is less than a predetermined number of channels.

According to an aspect of the disclosure, the method further includes obtaining the backend prediction neural network, and wherein the obtaining of the backend prediction neural network includes selecting at least one channel to be pruned from the channels of the backend prediction neural network based on a pixel variance of each of the channels of the backend prediction neural network; pruning the at least one channel from the channels of the backend prediction neural network; fine-tuning the backend prediction neural network based on the pruning; and detecting, by the fine-tuned backend prediction neural network, the key point information of the object.

According to an aspect of the disclosure, the obtaining of the backend prediction neural network further includes repeating the operations of the selecting the at least one channel, the pruning the at least one channel, the fine-tuning the backend prediction neural network, and the detecting the key point information of the object until the number of the channels of the backend prediction neural network reaches the predetermined number of channels.

According to another aspect of the disclosure, provided is an apparatus for estimating a pose of an object, the apparatus including a camera for capturing an image; and a processor for estimating poses of an object included in the captured image, obtaining skeleton information of the object based on the estimating of the poses of the object, and processing the skeleton information of the object for at least one of detecting occlusion of the object, detecting the poses of the object and adjusting content based on detected virtual object distinct from human body poses. According to an aspect of the disclosure, provided is a method for estimating a pose, a processing method based on pose estimation and an electronic apparatus, to realize high-accuracy pose estimation on a terminal apparatus with limited computing capacity and realize related applications based on pose estimation on the terminal device.

According to an aspect of the disclosure, a method for estimating a pose includes extracting, by a feature extraction neural network, features from an image; detecting, by a backend prediction neural network and according to the extracted features, key point information of an object; and constructing, according to the detected key point information, skeleton information of the object.

According to an aspect of the disclosure, the method further includes performing pose estimation on an image to obtain skeleton information of an object in the image; and performing corresponding processing based on the skeleton information of the object.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 15 illustrates a schematic view of correcting a pose according to an embodiment;

FIG. 17A illustrates a procedure of detecting pose consistency among multiple persons according to an embodiment;

FIG. 17B illustrates a procedure of detecting pose consistency among multiple persons according to an embodiment;

FIG. 21 illustrates an example of a virtual item interaction according to an embodiment of the disclosure;

DETAILED DESCRIPTION

Figure 1:
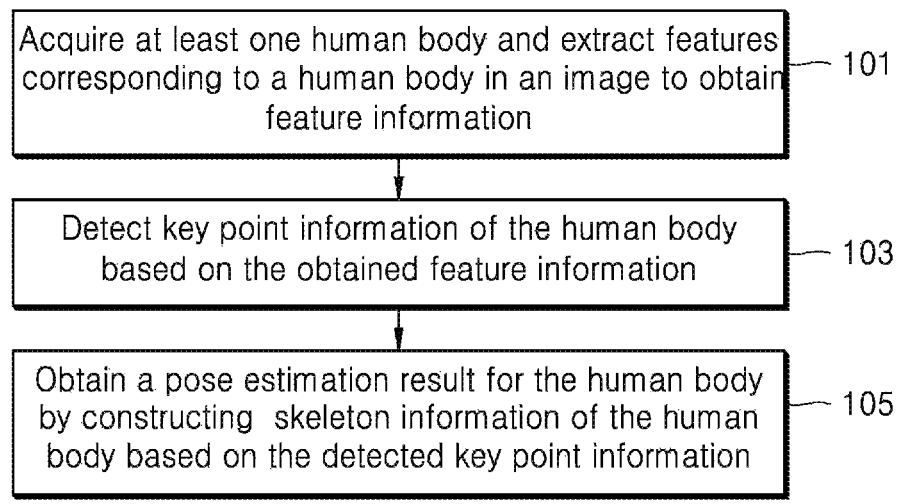
FIG. 1 is a flowchart illustrating a method for estimating a pose of an object in an image according to an embodiment.

The following description with reference to the accompanying drawings is provided to assist in a comprehensive understanding of various embodiments of the disclosure. The description includes various specific details to assist in that understanding, but these are to be regarded as merely exemplary. Accordingly, those of ordinary skill in the art will recognize that various changes and modifications of the various embodiments described herein may be made without departing from the scope and spirit of the disclosure.

The terms and words used in the following description and claims are merely used to enable a clear and consistent understanding of the disclosure. Accordingly, it should be apparent to those skilled in the art that the following description of various embodiments of the disclosure is provided for illustrative purposes only and not for the purpose of limiting the disclosure as defined by the appended claims and their equivalents.

As used herein, the terms "1st" or "first" and "2nd" or "second" may use corresponding components regardless of importance or order and are used to distinguish one component from another without limiting the components.

The terms "include" and "comprise," as well as derivatives thereof, mean inclusion without limitation. The term "and/or" includes a plurality of combinations of relevant items or any one item among a plurality of relevant items. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations thereof.

Moreover, various functions described below may be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A non-transitory computer readable medium includes media where data may be permanently stored and media where data may be stored and later overwritten, such as a rewritable optical disc or an erasable memory device.

Compared with the conventional technology, the disclosure has at least the following advantages.

In the disclosure, not only high-accuracy estimation of poses of objects in an image is realized, but also the network structure is simplified by adjusting the structure of a neural network. Also, while high-accuracy estimation of an object pose is ensured, the overall computational amount is reduced and a lightweight network is realized, so that high-accuracy estimation may be performed with respect to object poses by using a device with limited computational capacity.

In the disclosure, a lightweight feature extraction neural network may be obtained by adjusting a block structure and/or a bottleneck unit structure of a feature extraction neural network, and also, high-accuracy estimation may be further performed with respect to object poses by using the device.

In the disclosure, a lightweight backend prediction neural network is obtained may be obtained by integrating two existing backend prediction neural networks (a bone node backend prediction neural network and a bone node vector backend prediction neural network). Thus, the processing speed of the backend prediction neural network is improved, and high-accuracy estimation may be further performed with respect to object poses by using the device.

The disclosure further provides a processing method based on pose estimation. Related applications may be realized based on skeleton information obtained by pose estimation, and thus, pose estimation results may be effectively used and more convenient applications based on pose estimation may be developed for users.

The disclosure provides a method and an apparatus for estimating a pose and a processing method based on pose estimation. The specific implementations of the disclosure will be described below in detail with reference to the accompanying drawings.

FIG. 1 is a flowchart illustrating a method for estimating a pose of an object in an image according to an embodiment of the disclosure.

Referring to FIG. 1, the method for estimating a pose is provided. In the embodiment, at least one human body is used as an example of the object. In operation 101, an image including at least one human body is acquired, and a device may extract features corresponding to the at least one human body from the image to obtain feature information. Feature extraction may be performed by a feature extraction neural network.

In operation 103, the device may detect key point information of the at least one object which is, for example, a human body, based on the obtained feature information. In operation 105, the device may obtain a pose estimation result for the at least one human body included in the image by generating skeleton information of the at least one human body based on the detected key point information. According to the aforementioned process, high-accuracy pose estimation of the at least one human body (that is, the object) may be performed. The detection of the key point information may be performed by a backend prediction neural network according to an embodiment of the disclosure.

According to an embodiment of the disclosure, for estimating the pose of the object, the neural networks including a feature extraction neural network and a backend prediction neural network may be used for pose estimation with respect to the object. In another embodiment of the disclosure, for pose estimation with respect to the object is performed by a combination of a feature extraction neural network and a backend prediction neural network, a simplified neural network may be used by combining a simplified feature extraction neural network and a simplified backend prediction neural network. Thus, according to an embodiment, the pose of the object may be estimated with high accuracy even by a terminal device having limited computational capacity.

In an embodiment, the feature extraction neural network and the backend prediction neural network may be implemented or realized by a hardware processor included in an electronic device.

Figure 2:
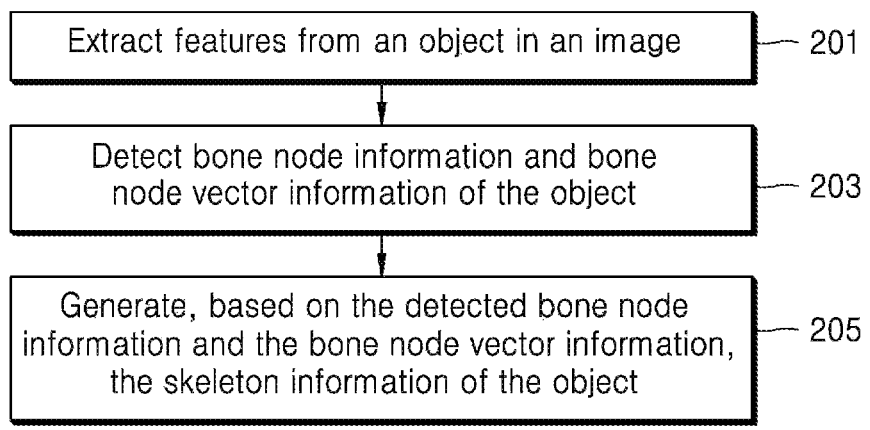
FIG. 2 is a flowchart illustrating a method for estimating a pose of an object in an image according to another embodiment.

FIG. 2 is a flowchart illustrating a method for estimating a pose of an object in an image according to another embodiment of the disclosure.

Referring to FIG. 2, in operation 201, features may be extracted from an object included in an image. Feature extraction may be performed via a feature extraction neural network. The feature extraction neural network may have a block structure and/or an adjusted bottleneck unit structure. A process of adjusting the feature extraction neural network will be described below in detail.

Section (1): The block structure of the feature extraction neural network is adjusted.

Each block may include several bottleneck units, and each bottleneck unit may include several convolution layers. In an actual feature extraction neural network, a first block may include only one convolution layer, for example, a 7*7 convolution layer.

Figure 3A:
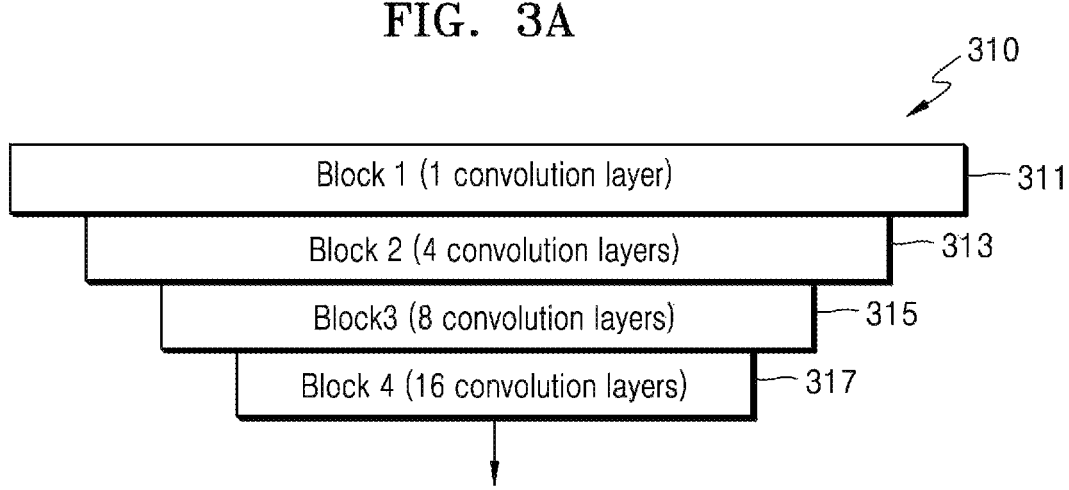
FIG. 3A illustrates a block structure of a feature extraction neural network according to embodiments.

FIG. 3A illustrates a block structure of a feature extraction neural network according to embodiments.

Figure 3B:
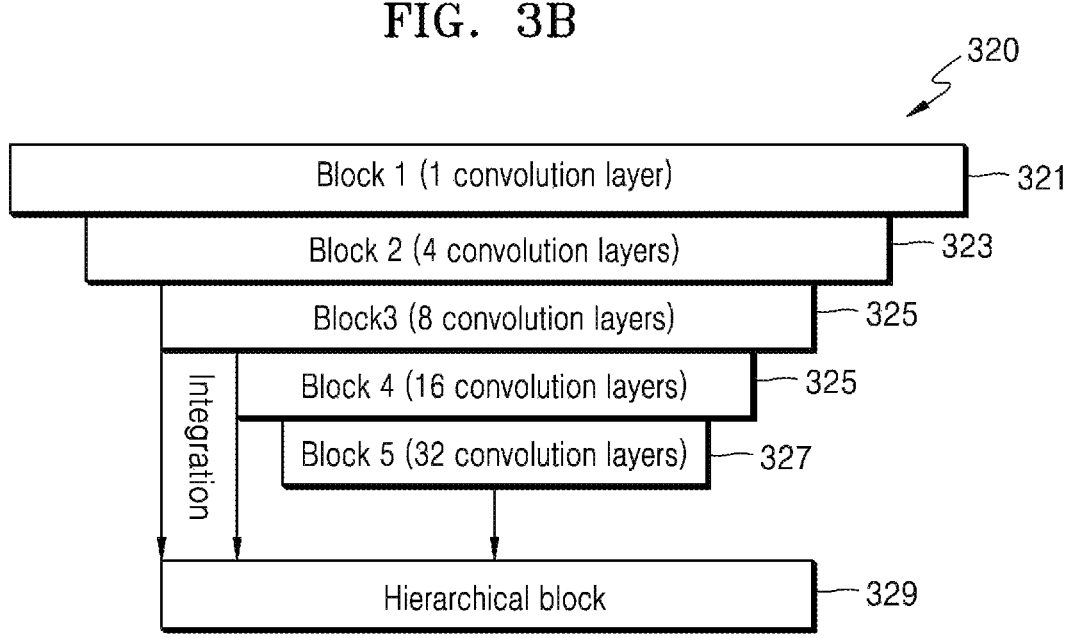
FIG. 3B illustrates a block structure of a feature extraction neural network according to embodiments.
Figure 3C:
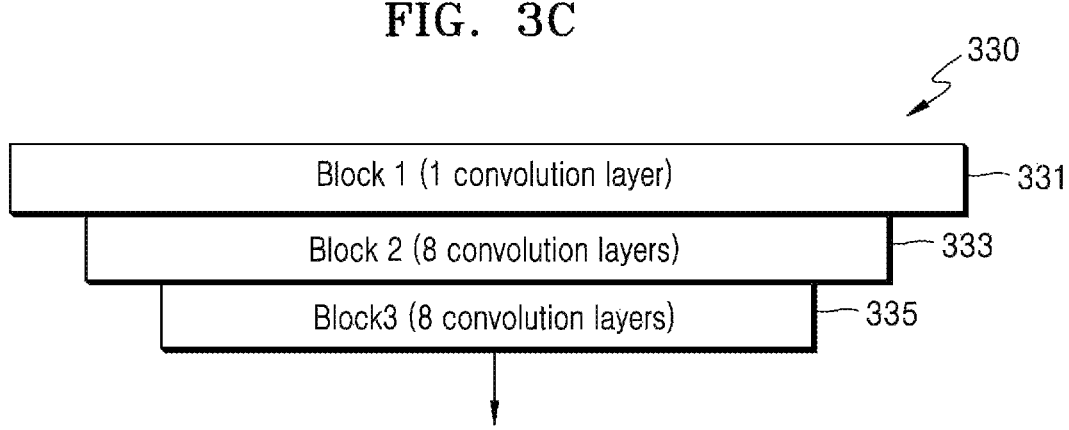
FIG. 3C illustrates a block structure of a feature extraction neural network according to embodiments.

Referring to FIG. 3A, FIG. 3B and FIG. 3C, solutions for adjusting the block structure of the feature extraction neural network are disclosed according to embodiments of the disclosure.

Referring to FIG. 3A, a basic structure of the feature extraction neural network which complies with the straight cylindrical design standard is illustrated. The basic structure includes stacked multiple blocks, block resolutions of the multiple blocks are reduced successively, and a deep-level semantic feature map of the image is obtained by a last block 317 with low resolution. According to this structure, in order to keep the final resolution not too low, backend blocks with low resolution are generally discarded. However, according to the straight cylindrical design standard, backend blocks with low resolution have more parameters, and a deep-level semantic feature map of the image which is at a higher level and more robust may be extracted. Discarding backend blocks with low resolution causes reduced quality of the extracted deep-level semantic feature map of the image, and thus, the performance of subsequent key point detection may be impaired.

FIG. 3B illustrates a multi-level structure 320 of the feature extraction neural network which complies with the U-shaped structure design standard. After multiple blocks are stacked, the resolution is reduced to the lowest value, and then a last block with high resolution (for example, a hierarchical block 329 in FIG. 3B) is obtained by upsampling and integrating front-end blocks with high resolution (for example, a block 3 323 and a block 4 325 in FIG. 3B). This multi-level structure 320 overcomes the shortcomings of the basic structure of FIG. 3A. According to the multi-level structure 320, while maintaining high resolution, a deep-level semantic feature map of the image with high quality may be obtained by using high-level semantic information provided by backend blocks with low resolution. This facilitates the improvement of the performance of subsequent key point detection. However, according to this method used in conjunction with the multi-level structure 320, the process of integrating backend blocks with low resolution and front-end blocks with low resolution requires a huge computational amount. That is, the computational amount is significantly increased to obtain high performance. Thus, the multi-level structure 320 shown in FIG. 3B is not suitable for devices such as mobile terminals with limited computational capacity.

FIG. 3C illustrates a structure 330 of the feature extraction neural network according to an embodiment of the disclosure, which complies with the straight cylindrical design standard is disclosed. Different from the structures 310 and 320, the structure 330 in FIG. 3C has fewer blocks, for example, there are four (4) blocks according to FIG. 3A and six (6) blocks according to FIG. 3B, and the structure according to FIG. 3C has only three (3) blocks. On the other hand, compared with the number of basic units (for example, convolution layers) in a block, structures 310 and 320, the same blocks 331, 333 and 335 in this structure includes more basic units. For example, the block 2 333 of FIG. 3C includes 8 convolution layers which are more than 4 convolution layers in block 2 313 of FIG. 3A and block 2 323 of FIG. 3B, and the block 3 335 of FIG. 3C includes 16 convolution layers which are more than 8 convolution layers in block 3 315 of FIG. 3A and the block 3 325 of FIG. 3B. This is equivalent to moving basic units in backend blocks to front-end blocks in the multi-level structure 320 in FIG. 3B. The purpose is to have more basic units so that the quality of the feature map may be improved. The adjusted structure of the feature extraction neural network combines the advantages of the technical solutions disclosed in FIG. 3A and FIG. 3B. More basic units are added to the blocks to keep the performance while simplifying the neural network.

In addition, bottleneck units in blocks in the structure of the feature extraction neural network may have the structure of existing bottleneck units. In addition, in the embodiments of the disclosure, the structure of bottleneck units in blocks may be adjusted, and the adjusted structure of bottleneck units (which are lightweight bottleneck units) may be different from the structure of bottleneck units of the existing technical solutions. Therefore, blocks including several lightweight bottleneck units are lightweight blocks, and lightweight bottleneck units will be specifically described in Section (2). If the block structure of the feature extraction neural network is simplified by using both the ways and the bottleneck units in blocks including lightweight bottleneck units, the overall computational amount is reduced, although the number of basic units in a block is greater than the number of basic units of the same block in the existing technical solutions.

The design including only three (3) blocks in the structure of the feature extraction neural network according to FIG. 3C is merely illustrating a preferred block design as an example embodiment of the disclosure. However, the embodiments of the disclosure are not limited to the design with 3 blocks.

According to an embodiment of the disclosure, the number of blocks in the feature extraction neural network is less than a number of target blocks. For example, the number of blocks in the feature extraction neural network may be three (3), and the number of target blocks may be four (4) (the number of blocks in FIG. 3A) or five (5) (the number of blocks in FIG. 3B). In addition, the number of basic units (for example, convolution layers) in the block is greater than the number of target units corresponding to the target block.

For example, the number of basic units included in the block 333 may be eight (8) (i.e. 8 convolution layers), and the number of corresponding target units included in the target block 2 323 may be four (4), the number of basic units included in the block 3 335 may be sixteen (16), and the number of corresponding target units in the target block 325 may be eight (8) according to FIG. 3B and FIG. 3C.

In an embodiment of the disclosure, the number of convolution layers in the feature extraction neural network is less than the number of first target convolution layers. For example, referring to the block structure of the feature extraction neural network as shown in FIGS. 3A, 3B and 3C, the feature extraction neural network includes twenty-five (25) (1+8+16) convolution layers in total, but the number of first target convolution layers may be twenty-nine (29) (the number of convolution layers in FIG. 3A) or sixty-one (61) (the number of convolution layers in FIG. 3B).

Section (2): The bottleneck unit structure of the feature extraction neural network is adjusted.

In an embodiment of the disclosure, the number of convolution layers included in at least one bottleneck unit in the feature extraction neural network is less than the number of second target convolution layers, and/or the number of Batch Normalization (BN) layers in at least one bottleneck unit is less than the number of target BN layers and/or no set convolution layer is included in at least one bottleneck unit. When the number of second target convolution layers is six (6), the number of target BN layers is four (4) and the set convolution layer is a 1*1 convolution layer.

Some of the bottleneck units of the feature extraction neural network may have at least one of the features or all of the bottleneck units may have at least one of the features.

The adjusting of the bottleneck unit structure of the feature extraction neural network includes adjusting convolution layers and/or BN layers of bottleneck units. More specifically, according to an embodiment, the adjusting of the bottleneck unit structure of the feature extraction neural network includes removing at least one BN layer in at least one bottleneck unit in the feature extraction neural network, and/or removing BN layers and convolution layers between the BN layers in at least one bottleneck unit, and/or removing at least one set convolution layer in at least one bottleneck unit.

In an embodiment of the disclosure, all of the bottleneck units may be adjusted or only some of the bottleneck units may be adjusted.

In an embodiment, the adjustment of the convolution layers and/or BN layers in bottleneck units may be performed based on conventional technical solutions.

Figure 4A:
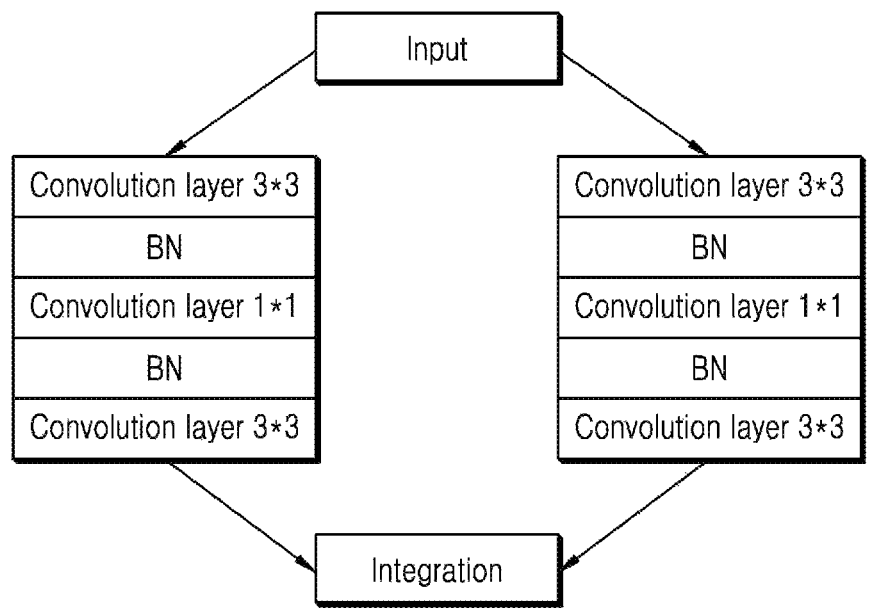
FIG. 4A illustrates a bottleneck structure of the feature extraction neural network according to embodiments.
Figure 4B:
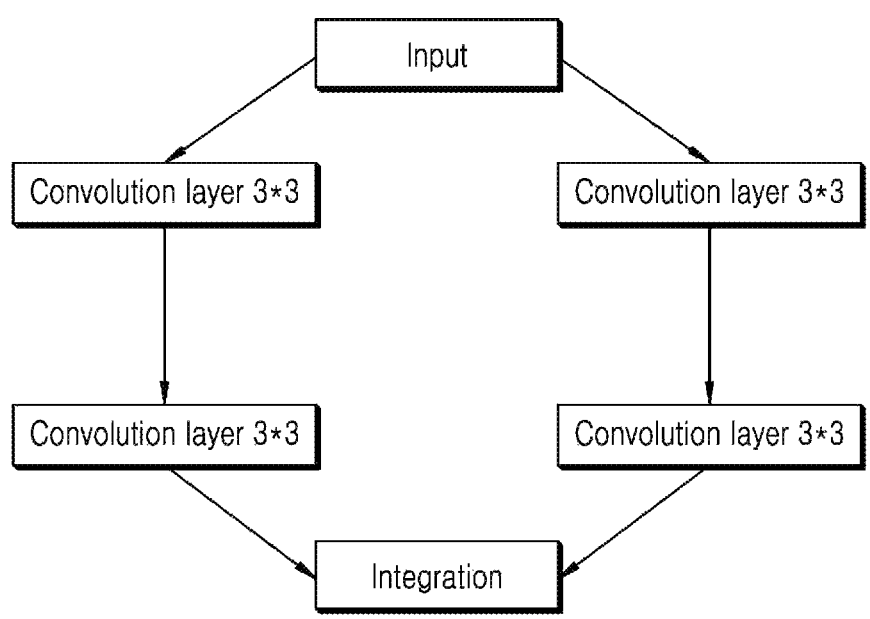
FIG. 4B illustrates a bottleneck structure of the feature extraction neural network according to embodiments.

FIG. 4A shows a bottleneck unit structure used in conventional technical solutions. FIG. 4B shows an adjusted bottleneck unit structure.

The bottleneck unit in FIG. 4A includes several convolution layers and several BN layers. Specifically, the bottleneck unit of FIG. 4A includes four (4) 3*3 convolution layers and two (2) 1*1 convolution layers along with BN layers set between any two adjacent convolution layers. The convolution layers are responsible for implementing the basic feature extraction function and the BN layers are used for assisting adjacent convolution layers. The BN layers may speed up and facilitate the training process of a deep learning neural network. In some network, the existence of the BN layers is crucial and the whole network may not converge and operate normally without BN layers. However, in other networks, the training process and normal operation may be completed even without the BN layers. Therefore, the use of the BN layers is closely related to the network structure design as described in Section 1.

Compared with the conventional technical solutions shown in FIG. 4A, some convolution layers and BN layers are removed from the bottleneck unit in FIG. 4B. Specifically, two (2) 1*1 convolution layers and the BN layers located between the two 1*1 convolution layers are removed. Thus, the overall structure is simplified. Experiments have proved that on the premise of using the structure of the feature extraction neural network obtained in the Section (1), it does not matter what BN layers are used for assistance, the training process may be completed smoothly and the network may operate normally. Therefore, the BN layers are almost useless in bottleneck units. On the other hand, the use of the BN layers will cause various problems. For example, the BN layers increase the computational amount and the memory consumption. Moreover, the BN layers reduce the universal transplantation of the network, and not all the mobile terminals may support the BN layers. Therefore, the advantage of removing BN layers from bottleneck units of blocks is obvious as it may not only reduce the computational amount but also may efficiently improve the platform compatibility of the network.

For the bottleneck unit, the adjustment method may include any one of the following operations:

Removing at least one set convolution layer, for example, removing two 1*1 convolution layers and retaining a BN layer between two 7*7 convolution layers;

Removing at least one BN layer, for example, removing two BN layers and retaining a 1*1 convolution layer between the BN layers; and Removing at least one set convolution layer and at least one BN layer, for example, removing two BN layers and a 1*1 convolution layer between the BN layers.

In an embodiment of the disclosure, the feature extraction neural network is simplified so that the overall computational amount is reduced and the network processing efficiency is improved. Therefore, the simplified bottleneck unit may be referred to as a lightweight bottleneck unit, the simplified block may be referred to as a lightweight block, and the simplified feature extraction neural network may also be referred to as a lightweight feature extraction neural network.

In an embodiment of the disclosure, each bottleneck unit may include several convolution units and each convolution unit may include at least one convolution layer. Referring to FIG. 4B, the two 3*3 convolution layers connected in series on the left side are considered as one convolution unit, and the other two 3*3 convolution layers on the right side are considered as one convolution unit. Two convolution units process a feature map or an image input to the bottleneck unit in parallel, and then processing results are integrated to obtain an output result of the bottleneck unit, and the output result is output to the backend prediction neural network or to the next bottleneck unit.

In an embodiment of the disclosure, the operation of extracting, by a feature extraction neural network, features from an image includes extracting, by convolution units in a bottleneck unit, features from an image or a feature map respectively, where the feature map is a feature map obtained by performing one or more convolutions on the image; integrating feature maps obtained by the convolution units; and outputting the integrated feature map to a backend prediction neural network or to the next bottleneck unit; and performing, by the convolution units, two or more convolutions on the image or the feature map without performing BN between two adjacent convolutions and alternatively performing, by the convolution units, two convolutions on the image or the feature map along with performing BN between the two convolutions. The processing of the image or the feature map by one convolution layer may be considered as one convolution.

Referring to FIG. 4A, a bottleneck unit structure of the conventional technology is shown. Referring to FIG. 4B, an adjusted bottleneck unit structure is shown. That is, two 1*1 convolution layers and the BN layers are removed, the convolution units perform two convolutions on the image or the feature map consecutively, and no BN is performed between the two adjacent convolutions. If only BN layers are removed and the 1*1 convolution layers are retained, the convolution units successively perform multiple (for example, three) convolutions on the image or the feature map, and no BN is performed between two adjacent convolutions. If only 1*1 convolution layers are removed and BN layers between 3*3 convolution layers are retained, the convolution units successively perform two convolutions on the image or the feature map, and BN is performed between the two adjacent convolutions.

In an embodiment of the disclosure, if the first block in the feature extraction neural network includes only one convolution layer, inputs received by each bottleneck unit are feature maps.

Referring back to FIG. 2, key point information of an object is detected according to the extracted features in operation 203.

When the key point information of the object is being detected, corresponding processing may be performed based on a backend prediction neural network. The backend prediction neural network may be a neural network of which the network structure is adjusted.

The key point information of the object includes bone node information and bone node vector information. Bone node vectors refer to directions between bone nodes. The path from one bone node to another bone node is called a vector, which is a line between nodes and has directionality.

In operation 203, the detecting, according to the extracted features, of the key point information of an object includes detecting, according to the extracted features, the bone node information and the bone node vector information of the object. The number of channels of the backend prediction neural network is less than a set number of channels.

Figure 5:
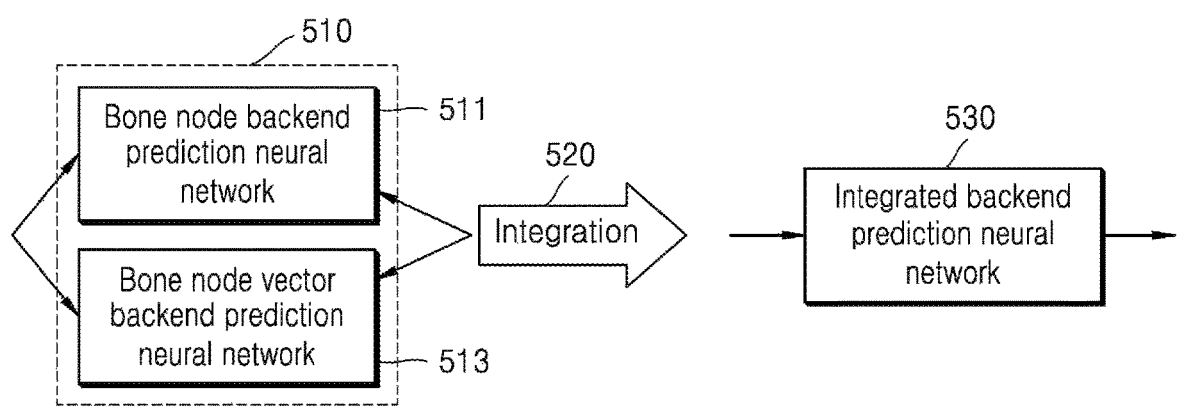
FIG. 5 illustrates a backend prediction neural network according to an embodiment.

Referring to FIG. 5, a backend prediction neural network 510 includes two branches, i.e., a bone node backend prediction neural network 511 and a bone node vector backend prediction neural network 513. For a high-level feature map, a bone node prediction map and a bone node vector prediction map are obtained, respectively, based on the two branches (i.e., the bone node backend prediction neural network and the bone node vector backend prediction neural network). The two neural networks, i.e., the bone node backend prediction neural network and the bone node vector backend prediction neural network, may be independent from each other and do not share parameters. In an embodiment of the disclosure, by integrating the bone node backend prediction neural network and the bone node vector backend prediction neural network (i.e., the integrated backend prediction neural network, which may be referred to as the backend prediction neural network of which the network structure is adjusted), a bone node prediction map and a bone node vector prediction map (i.e., the bone node information and the bone node vector information) may be simultaneously obtained by the backend prediction neural network, which is equivalent to integrating the two sub-networks, i.e., the previous bone node backend prediction neural network and bone node vector backend prediction neural network, to share parameters.

Conventionally, the structures of the two branches are completely consistent with each other. However, since it is considered that bone node prediction and bone node vector prediction are two tasks which are completely independent and different from each other, two independent sub-networks are designed subjectively. Each of the two independent sub-networks may have 256 channels. In fact, functions of the two sub-networks described above may be implemented equivalently by using one network having 512 channels, with almost identical performance. Mathematical results prove that two sub-networks with 256 channels are subsets of an integrated network with 512 channels. Therefore, in an embodiment, a bone node prediction map and a bone node vector prediction map are simultaneously obtained by using only one integrated backend prediction neural network.

Further, there is actually a strong internal connection between the bone node prediction map and the vector prediction map. Bone node vectors are, in fact, lines with directionality between bone nodes. This means that the two prediction maps may share some network parameters. For example, there is no need to replace two sub-networks having 256 channels with a network having 512 channels, because some of the 512 channels may be redundant. Therefore, in the embodiments of the disclosure, the integrated backend prediction neural network may be further compressed, for example, redundant channels may be found and removed from the 512 channels by pruning.

Further, the backend prediction neural network is obtained as follows.

Operation 1A. Selecting, based on a pixel variance of each channel, a channel to be pruned from channels of the backend prediction neural network;

Operation 2A. Pruning the selected channel;

Operation 3A. Fine-tuning the pruned backend prediction neural network;

Operation 4A. Detecting, by using the fine-tuned backend prediction neural network, the key point information of the object;

Operation 5A. Determining, based on the detected key point information, whether to prune the selected channel or retain the selected channel; and Operation 6A. Repeating the Operations 1A through 5 until the number of channels of the backend prediction neural network reaches, i.e., is equal to, a set number of channels. The set number of channels may be 256.

Figure 6:
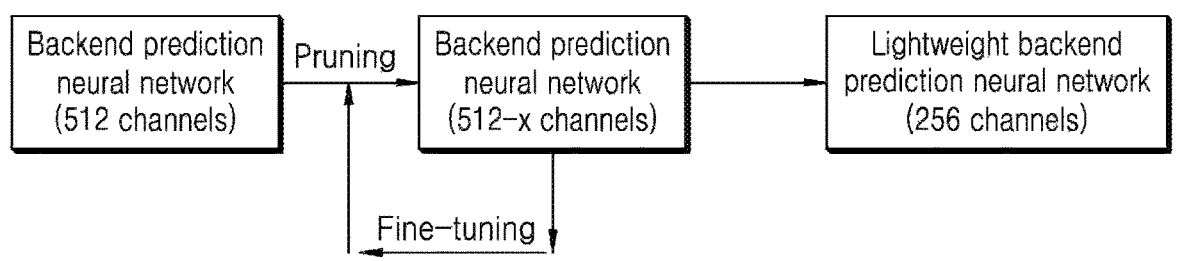
FIG. 6 illustrates another backend prediction neural network according to an embodiment.

Since there are redundant channels in the integrated backend prediction neural network, the redundant channels may be found and removed by pruning, in order to reduce the number of channels. Also, the pruning method needs to work together with a fine-tuning process so that the degradation of the prediction performance of the backend neural networks may be prevented. Referring to FIG. 6, a backend prediction neural network with 512-x channels (x is a set unfixed value) is obtained by pruning the integrated backend prediction neural network with 512 channels. During the pruning, according to a response degree of each channel (which is related to pixel variances of channels), channels with weak response are removed first. After the pruning process, the number of channels is reduced, and thus, the data transmission performance will be decreased. In an example embodiment, the prediction performance of the backend neural network needs to be ensured by the fine-tuning process, and thus several iterative training processes are performed on a dataset. Accordingly, the prediction performance of the backend neural network may be improved to the state before the pruning. After several cycles of pruning and fine—tuning, i.e., adjusting, a lightweight backend prediction neural network having only 256 channels is obtained in the long run. By this processing, the number of channels and parameters of the obtained backend prediction neural network becomes only half of the number of channels of the conventional technology, while the processing speed becomes twice faster than that of the conventional technology. Therefore, the overall network speed may be improved by a quarter.

In an embodiment of the disclosure, other ways of compressing the network may be used to compress the backend prediction neural network, for example, quantization and knowledge distillation, or a combination of multiple compression ways may be used.

Referring back to FIG. 2, in operation 205, skeleton information of the object is generated based on the detected key point information. The detected skeleton information of the object may include bone node information and/or bone node vector information of the object.

In an embodiment of the disclosure, not only high-accuracy pose estimation of objects is realized, but also the network structure is simplified by adjusting the structure of a feature extraction neural network. Also, the high-accuracy of object pose estimation is ensured, and the overall computational amount is reduced. By adjusting the network structure of a backend prediction neural network, redundant channels are removed, and thus the processing speed of the backend prediction neural network is increased. Further, by compressing the backend prediction neural network, a lightweight network is realized so that high-accuracy estimation may be performed with respect to object poses even by a terminal device with low processing capacity.

Figure 7:
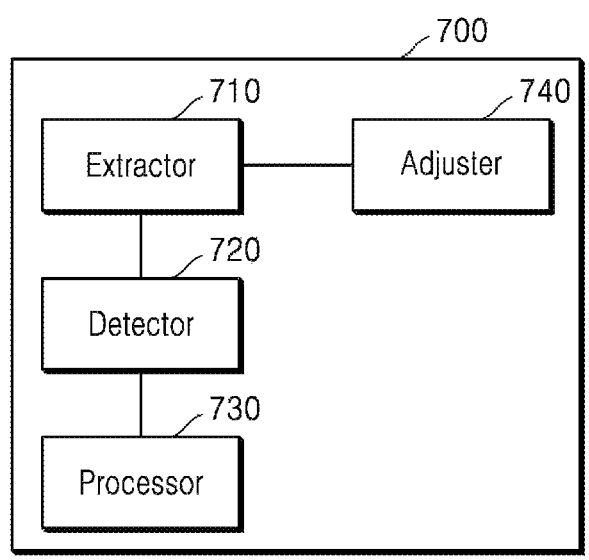
FIG. 7 illustrates a device for estimating a pose of an object in an image according to an embodiment.

Based on the method of estimating a pose of an object in an image according to FIG. 1 of the disclosure, the disclosure further provides a device for estimating a pose of an object in an image referring to FIG. 7.

Referring to FIG. 7, a device 700 may include an extractor 710, a detector 720, a processor 730, and an adjuster 740. The extractor 710, the detector 720, the processor 730, and the adjuster 740 may be implemented as at least one hardware processor.

The extractor 710 may extract, by a feature extraction neural network, features from an image. The detector 720 may detect, by a backend prediction neural network and according to the extracted features, key point information of an object. The processor 730 may generate, based on the detected key point information, skeleton information of the object. The extractor 710 may extract, based on a neural network, features from the image of the object. A neural network using the device 700 may include a feature extraction neural network after a hierarchical structure thereof is adjusted and/or a backend prediction neural network after a network structure thereof is adjusted.

The number of convolution layers included in at least one bottleneck unit in the feature extraction neural network is less than a set number of second target convolution layers, the number of the BN layers in at least one bottleneck unit is less than a set number of target BN layers, and/or no set convolution layer is included in at least one bottleneck unit. The number of convolution layers in the feature extraction neural network is less than a set number of target convolution layers. Further, the key point information of the object includes bone node information and bone node vector information of the object. According to an embodiment, the detector 720 may detect, by a backend prediction neural network, according to the extracted features, the bone node information and the bone node vector information of the object and integrate a bone node backend prediction neural network and a bone node vector backend prediction neural network.

The number of channels of the backend prediction neural network is less than a set number of channels.

Further, the backend prediction neural network is obtained as follows.

Operation 1B. Selecting, based on a pixel variance of each channel, a channel to be pruned from channels of the backend prediction neural network;

Operation 2B. Pruning the selected channel;

Operation 3B. Fine-tuning the pruned backend prediction neural network;

Operation 4B. Detecting, by using the fine-tuned backend prediction neural network, the key point information of the object;

Operation 5B. Determining, based on the detected key point information, whether to prune the selected channel or retain the selected channel; and Operation 6B. Repeating the Operations 1B to 5B until the number of channels of the backend prediction neural network reaches the set number of channels.

In addition, the backend prediction neural network generally uses large 7*7 convolution layers, such as ten (10) 7*7 convolution layers. In an embodiment of the disclosure, the integrated and compressed backend prediction neural network includes two bottleneck units. The backend prediction neural network is constructed by using the structure of two bottleneck units connected in series. If the structure of bottleneck units is constructed as shown in FIG. 4B, there are eight (8) 3*3 convolution layers in total in the backend prediction neural network. By reducing the convolution layers and narrowing parameters of the convolution layers, the computational amount and the model size are significantly reduced.

In the disclosure, by adjusting the block structure and/or the bottleneck unit structure of the feature extraction neural network, a lightweight feature extraction neural network may be obtained and high-accuracy estimation may be further performed with respect to the object poses by a terminal device. By integrating two backend prediction neural networks (the bone node backend prediction neural network and the bone node vector backend prediction neural network), a lightweight backend prediction neural network is obtained so that the processing speed of the backend prediction neural network is improved and high-accuracy estimation may be further performed with respect to the object poses by the terminal device.

Since no related application based on pose estimation is realized or implemented on a terminal device in the conventional art, pose estimation may be performed with respect to an object in an image to obtain skeleton information of the object and corresponding processing may be performed based on the skeleton information of the object according to another embodiment of the disclosure.

The process may be performed on an image or a video acquired in real time during photographing, i.e., during digital photography, or the process may be performed on an obtained image or video after photographing. For example, a system may have some intelligent functions to facilitate photographing by a user based on pose estimation results during the photographing or after the photographing, according to pose estimation technology.

According to conventional technology, during photographing by a user, the user generally needs to check one by one whether any person is occluded, e.g., blocked, obstructed, obscured, etc., in photos or videos. Hereinafter, occlude, block, obstruct, obscure, and variations thereof, are use interchangeably. Blocking may be worse in multi-person photographing. At present, there is no solution to automatically detect and issue a notification about blocked objects.

In the case of multi-person photographing, the user's main interest is how to capture suitable photos, i.e., digitally capture suitable photos. According to conventional technology, this may be realized only by simple face/gesture/voice recognition in cameras, and the quality of the captured photos greatly depends on the photographing skills of the photographer and the poses of the photographed objects. Thus, it is difficult to realize automatic capturing in multi-person photographing.

Moreover, during user's photographing of a scene where there are threshold requirements on poses (for example, in case of taking an identification photo), the user relies only on his or her experience alone. However, the obtained photos may not satisfy the desired requirements. Thus, currently, there is no solution to automatically provide corresponding adjustment advice for object poses during photographing.

In addition, some sports have high requirements on poses, for example, golf and tennis, and there is no solution which automatically evaluates sport poses of the user and provides corresponding adjustment advice.

To address the foregoing photographing inconveniences, an intelligent processing system based on pose estimation is provided according to an embodiment of the disclosure. The intelligent processing system of the disclosure mainly includes the following three aspects:
1) blocking detection, 2) pose detection, and 3) content adjustment.

In blocking detection, blocking may be automatically detected and a blocking warning with respect to the photographed object may be generated.

In pose detection, object poses may be detected and pose adjustment advice may be given. For example, pose adjustment advice is given or automatic correction is performed when photographing an identification photo, or pose estimation results or pose adjustment advice is given according to sports images or video of a user.

Also, in pose detection, the pose consistency in multi-person photographing may be detected and a capturing function may be automatically triggered.

In content adjustment, other functions related to the human body pose, such as content replacement, content adding, content deletion and content adjustment based on virtual information, may be activated based on the detected poses of objects.

Figure 8:
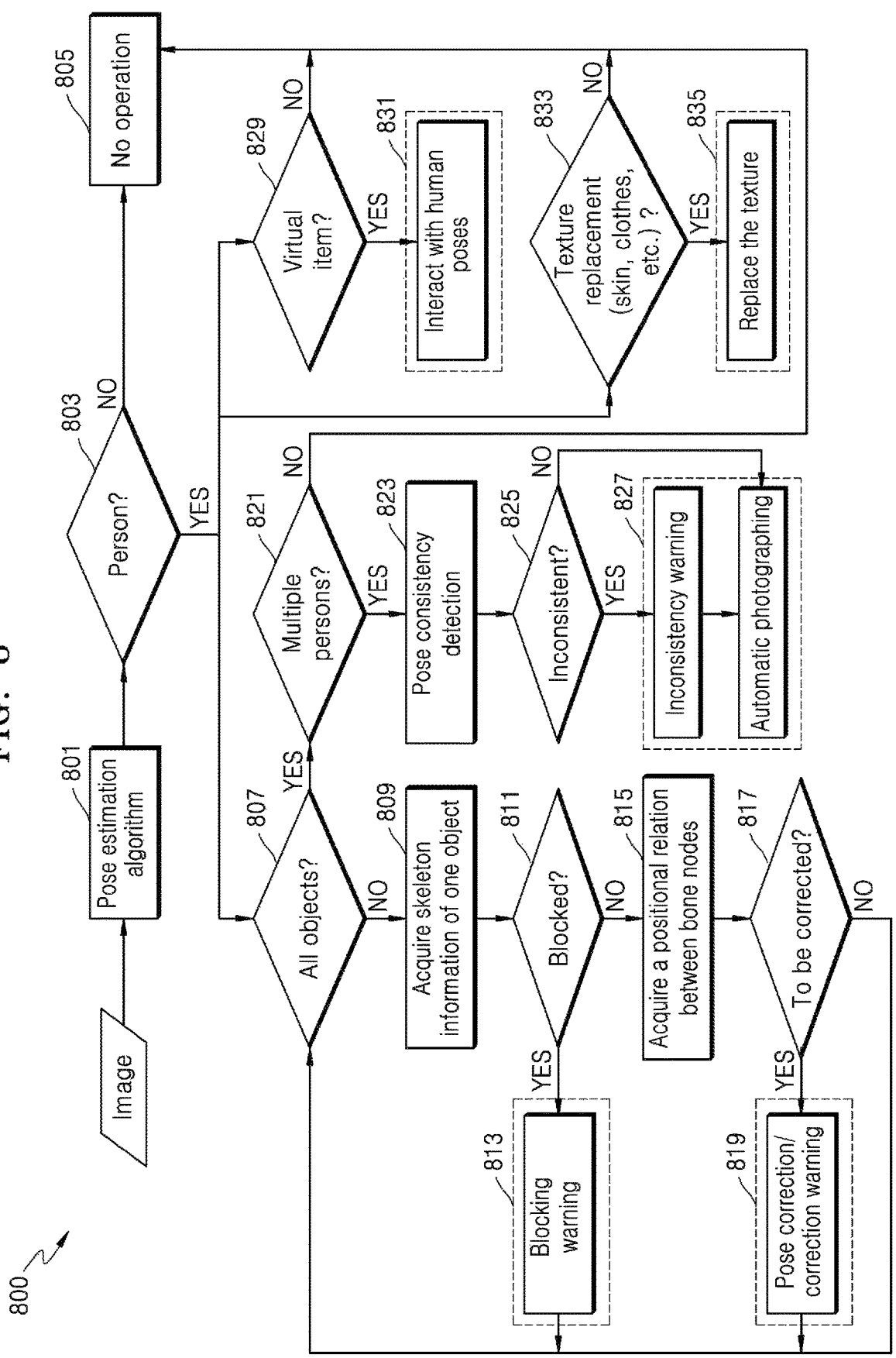
FIG. 8 is a flowchart illustrating intelligent photographing based on a pose estimation algorithm according to an embodiment.

FIG. 8 is a flowchart illustrating intelligent photographing based on a pose estimation algorithm according to an embodiment.

In operation 801, during photographing or the capturing of a still image or a video image by a user, the system performs pose estimation with respect to photographed objects included in an image captured by a camera and also performs corresponding processing according to a pose estimation result. The processing is performed as follows.

First, in operation 803, it is determined whether there is any person in the image captured by the camera according to a pose estimation algorithm. If pose estimation performed by a neural network is obtained by training samples which only contain persons, then as long as poses of objects are detected according to the pose estimation algorithm, the detected objects may be considered to be persons as long as the poses of the objects are detected according to the pose estimation algorithm. If no poses of objects are detected, that is, if no person is detected, no operation may be performed in operation 805.

If a person is detected in the image, the following operations may be performed for skeletons of different detected objects one by one, that is, the following operations may be performed until all the skeletons of all objects have been considered (operation 807). Skeleton information of one object is acquired in operation 809, and it is determined whether there is a blocking with regard to this skeleton of the one object according to the existence of bone nodes in operation 811. If a blocking is detected in the one object, the blocking warning/notifying function is triggered in operation 813 and then operations for the skeleton information of the next object are carried out (operation 807). If no blocking is detected, a positional relationship between the bone nodes is acquired in operation 815 and it is determined whether the skeleton pose of the object needs to be corrected in operation 817. If it is determined that correction is needed, a function of automatically correcting or providing a pose correction warning/notification (which may contain pose correction advice) is triggered in operation 819.

After the aforementioned operations are performed on all skeletons, it is determined whether the image is a photo containing multiple persons, that is to say, whether the image contains multiple objects in operation 821. If it is detected that the image is a photo containing multiple persons, skeleton pose consistency of all objects in the image is detected in operation 823. If it is detected in operation 823 that poses of multiple persons are inconsistent in operation 825, a warning or a notification is provided to the user, and/or a function of automatic photographing is triggered in operation 827 if poses of multiple persons are not inconsistent in operation 823.

Also, if poses of objects are detected from the image, that is, there is a person in the image (operation 803), the user may perform texture replacement in regions such as the skin and clothes of the person in the image as required in operation 833 and 835, or when there are virtual items in the image in operation 829, an image may be composited based on interactions between virtual items and human body poses to obtain an image that further undergoes Augmented Reality (AR) processing in operation 831.

In the disclosure, the implementation of each embodiment depends on the object pose estimation result, and the object pose estimation result described below may include bone node information and bone node vector information of the human body. The bone node information may include bone node position information. In addition, the estimated skeleton information of the object may also include semantic information of each bone node and the semantic information may represent which part the bone node belongs to. For example, a certain bone node is an eye node.

Figure 9:
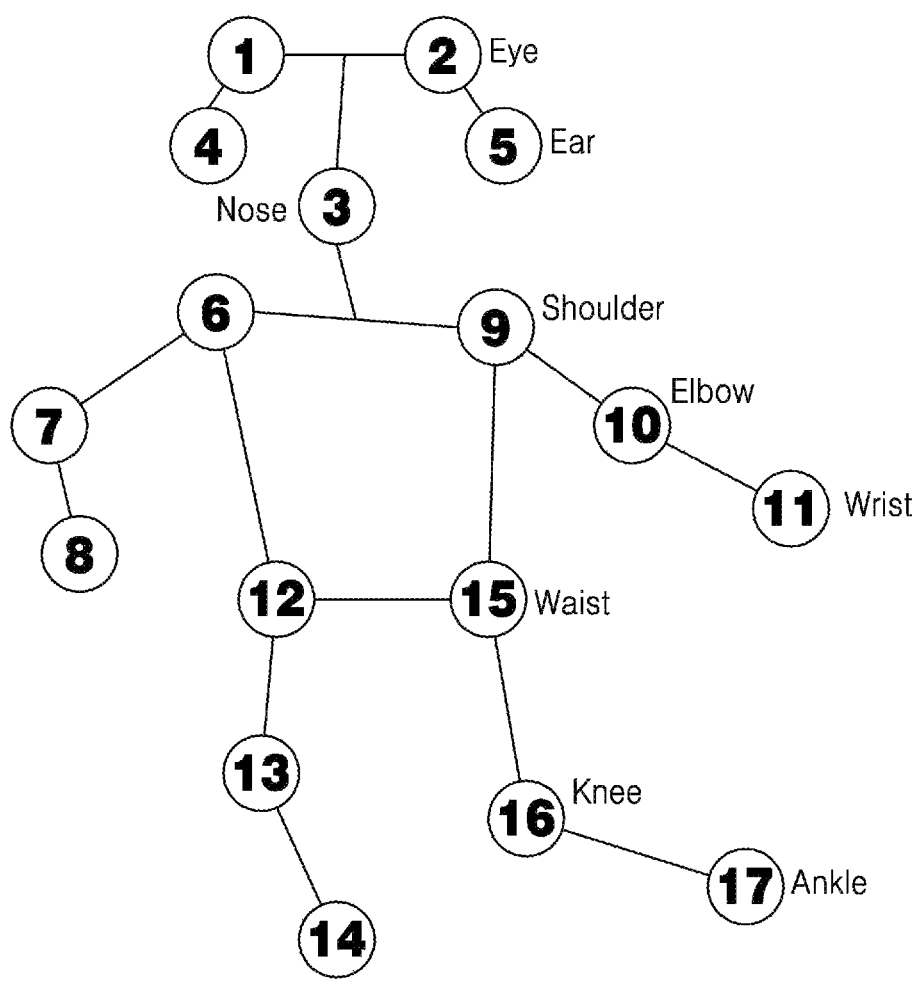
FIG. 9 illustrates a schematic view of a human skeleton according to an embodiment.

FIG. 9 illustrates a schematic view of a human skeleton according to an embodiment.

Referring to FIG. 9, the number of bone nodes in a human skeleton may be seventeen (17). Bone nodes 1 and 2 are eye nodes, bone nodes 4 and 5 are ear nodes, bone node 3 is a nose node, bone nodes 6 and 9 are shoulder nodes, bone nodes 7 and 10 are elbow nodes, bone nodes 8 and 11 are wrist nodes, bone nodes 12 and 15 are waist nodes, bone nodes 13 and 16 are knee nodes, and bone nodes 14 and 17 are ankle nodes. However, the disclosure is not limited to the above number of bone nodes of the human skeleton and the numbering of the bone nodes. Accordingly, the human skeleton may include more or less than 17 bone nodes.

In an embodiment of the disclosure, pose estimation may be performed on the object in the image to obtain the skeleton information by using the method for estimating a pose according to an embodiment of the disclosure. Moreover, all functions in the disclosure may be terminated or started via user's instructions at any time.

Figure 10:
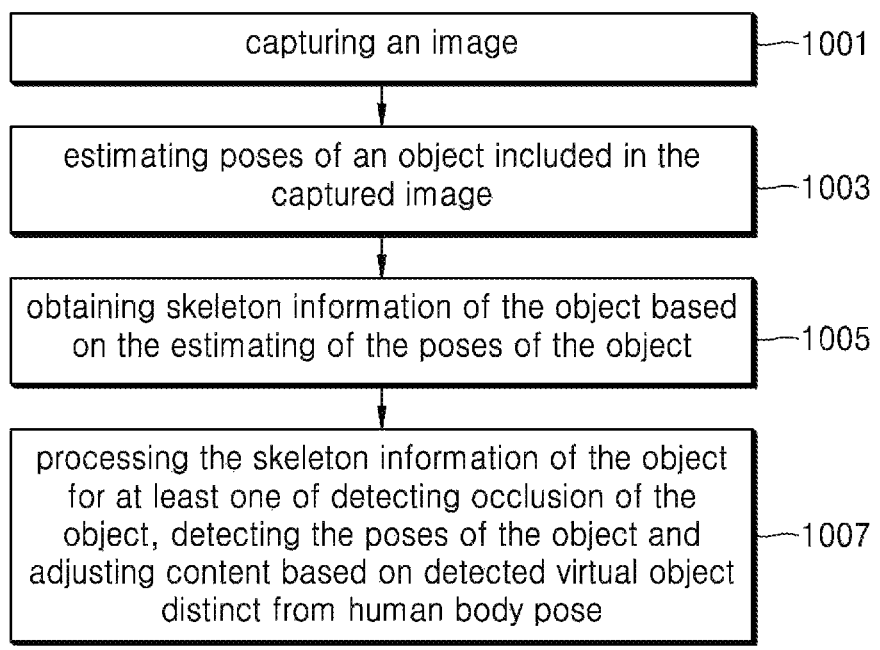
FIG. 10 is a flowchart illustrating a processing method based on pose estimation according to an embodiment.

FIG. 10 is a flowchart illustrating a processing method based on pose estimation according to an embodiment.

Referring to FIG. 10, the disclosure provides a processing method based on pose estimation including the following operations according to an embodiment.

In operation 1001, a user may capture an image via an image capturing device such as a smart phone or a tablet.

In operation 1003, pose estimation is performed with respect to an object included in the captured image to obtain skeleton information of the object. The image may be captured in a preview state. That is, pose estimation may be performed with respect to the image in real time during the capturing of the image, and processing such as blocking detection, pose detection and content adjustment may be subsequently performed based on the skeleton information obtained via the pose estimation to provide a corresponding warning/notification or correction.

In another embodiment, the image may be an image obtained by photographing. In this case, post-photographing processing may be performed based on the captured image. For example, pose estimation is performed according to the photographed image to obtain the skeleton information, and processing such as blocking detection, pose detection and content adjustment is performed to provide a corresponding warning/notification or correction. In this operation, the performing of the pose estimation with respect to the image includes extracting, based on a feature extraction neural network, features from the image, detecting, based on a backend prediction neural network and according to the extracted features, key point information of the object, and constructing, based on the detected key point information, the skeleton information of the object.

In operation 1005, the skeleton information of the image may be obtained based on the pose estimation performed with respect to the object.

In operation 1007, corresponding processing is performed based on the skeleton information of the object. The corresponding processing includes at least one of blocking detection, pose detection, or content adjustment.

The above processing will be described below in more detail.

(1) The blocking detection is performed based on the skeleton information of the object.

Operation 1C: When the number of all bone nodes corresponding to the object is detected, blocking of the object is determined according to the detected number of bone nodes of the object. Once it is determined that a blocking of the object is detected, a condition of providing a blocking warning/notification is fulfilled. If the condition is fulfilled, a blocking warning or a blocking notification may be provided on a display of a device.

Operation 2C: When it is detected that all skeleton parts of the object are blocked, the condition of providing a blocking warning or a blocking notification is fulfilled. If the condition is fulfilled, the blocking warning or the blocking notification may be displayed on the display of the device.

Operation 3C: Some skeleton parts to be detected are selected according to user settings, the device status, and/or a scene corresponding to the image, and if a blocking of these selected skeleton parts is detected, and the device determines according to the detected blocking that the condition of providing a blocking warning or a notification is fulfilled. If the condition is fulfilled, the blocking warning/notification may be generated.

Operation 4C: Blocking of skeleton parts is successively detected according to an order of skeleton parts. The order of skeleton parts may be determined according to user settings, device status and/or a scene corresponding to the image. Then, it is determined according to the blocking of skeleton parts that the condition of providing a blocking warning or a blocking notification is fulfilled. If the condition is fulfilled, the blocking warning or the blocking notification may be displayed.

Operation 5C: If the blocking of skeleton parts is successively detected according to the order of skeleton parts and the current detection result fulfills the condition of providing a blocking warning, the detection may be stopped and a blocking warning is directly generated.

Operation 6C: The operation 1C may be executed before the operations of 2C, 3C, 4C and 5C described above. The operation 1C may be executed independently. That is, it is determined whether the object is blocked based on the detected number of bone nodes of the object only. Alternatively, this processing may be executed before executing the subsequent processing, for example, when it is detected that the number of bone nodes of the object is less than 17, it is considered that a blocking may exist, then the operation 5C is used to successively detect the skeleton parts to further determine which skeleton parts are blocked.

In particular, several representative blocking detections will be described according to an embodiment of disclosure below.

a) A blocking of the object is determined according to bone nodes corresponding to the object (corresponding to the above-noted operation 1C). The operation of determining blocking of the object specifically includes determining, according to the number of bone nodes corresponding to the object, the blocking of the object.

b) Skeleton parts to be detected corresponding to the object are obtained, and the blocking of the skeleton parts is determined according to bone nodes corresponding to the skeleton parts to be detected (corresponding to operations 2C to 5C). The skeleton parts to be detected may be all of the skeleton parts or some of the skeleton parts.

For the detection according to operation 6, the above-noted sub-operations a) and b) may be simultaneously performed to determine an occurrence of blocking. For example, the sub-operation a) is first used to determine the overall blocking of the object, and if it is determined according to the overall blocking that the object may be blocked, the sub-operation b) may be performed to determine the blocking of specific skeleton parts.

In this step, the obtaining skeleton parts to be detected corresponding to the object includes selecting, according to at least one of the information, the skeleton parts to be detected from skeleton parts corresponding to the object. The information may include scene information corresponding to the image user settings and device status information.

All of the skeleton parts of the object may be selected as the skeleton parts to be detected.

The skeleton parts to be detected may be selected according to the user settings. For example, the user presets certain skeleton parts of interest (for example, the eye skeleton part, the ear skeleton part and the nose skeleton part).

The skeleton parts to be detected may be automatically determined. For example, parts which the user may be concerned about are determined according to the photographing scene corresponding to the image. For example, when a single-person photos is taken, the user may be concerned about the face, the elbows and the legs, and thus the selected skeleton parts to be detected include the eye skeleton part, the ear skeleton part, the nose skeleton part, the elbow skeleton part, the knee skeleton part and the ankle skeleton part. When a taken photo contains multiple persons, the user may be concerned about only the face, and thus, the selected skeleton parts to be detected include the eye skeleton part, the ear skeleton part and the nose skeleton part.

The skeleton parts to be detected may also be automatically selected according to the device status. For example, when the power capacity of the device is sufficient or there are enough computing resources, more skeleton parts may be selected for detection. When the power capacity of the device is not sufficient or computing resources are not enough, less skeleton parts may be selected for detection.

In addition, the skeleton parts to be detected may be comprehensively selected according to the above information. For example, the skeleton parts to be detected are comprehensively selected according to the photographing scene corresponding to the image and the device status. When a photo containing multiple persons is taken, if the power capacity of the apparatus is sufficient and there are enough computing resources, the selected skeleton parts to be detected may include the eye skeleton part, the ear skeleton part, the nose skeleton part, the shoulder skeleton part, the elbow skeleton part and the wrist skeleton part. If the power capacity of the device is not sufficient or there are enough computing resources, the selected skeleton parts to be detected may include the eye skeleton part, the ear skeleton part and the nose skeleton part.

Further, the determining of an occurrence of a blocking of the skeleton parts according to bone nodes corresponding to the skeleton parts to be detected includes successively determining, according to a predetermined skeleton part detection order and for bone nodes corresponding to each skeleton part to be detected, a blocking of each skeleton part.

The above detection order may also be determined according to at least one of the scene information corresponding to the image, the user settings and/or the device status information.

The detection order may be determined according to the user settings. For example, the user presets the detection order, for example, the eye skeleton part, the nose skeleton part, the ear skeleton part, etc.

The detection order may also be automatically determined. For example, the order which the user may be concerned about is determined according to the photographing scene corresponding to the image. For example, when a photo containing multiple persons is taken, the user may be concerned most about the eyes, then the nose, the ears, and the shoulders. Therefore, the detection order may be the eye skeleton part, the nose skeleton part, the ear skeleton part and the shoulder skeleton part.

The detection order may also be automatically determined according to the device status. For example, when the power capacity of the apparatus is sufficient or there are enough computing resources, the skeleton parts may be successively detected in an bottom to top order. When the power capacity of the device is not sufficient or there are not enough computing resources, detection may be performed according to an order which the user may be concerned about. The order may be the face, the shoulders, and the waist.

In addition, the detection order may also be comprehensively determined according to the above information.

After the blocking is obtained or determined, a corresponding blocking warning or a blocking notification may be output based on the detected blocking. If the detected blocking fulfills a preset blocking warning condition, a warning may be provided. It may be determined in real time whether the blocking warning condition is fulfilled according to the current detection result in real time during the detection, according to the final detection result.

In an embodiment of the disclosure, the outputting, based on the detected blocking, of a blocking warning includes at least one of outputting a blocking warning when the number of skeleton parts reaches a predetermined threshold of the number of skeleton parts; and outputting a blocking warning when a blocking degree of a set skeleton part becomes same as a set blocking degree.

For operation 1C of the blocking detection, the number of all bone nodes corresponding to the object is detected, and it is determined according to the detected number of bone nodes of the object whether the condition of providing a blocking warning or a blocking notification is fulfilled. If the condition is fulfilled, a blocking warning/notification may be provided. Specifically, if the number of all bone nodes corresponding to the object is greater than a predetermined threshold number of bone nodes corresponding to the object, it may be considered that there is no blocking. If the number of all bone nodes corresponding to the object is less than the predetermined threshold number of bone nodes, it may be considered that the object may be blocked. In this case, further detection may be performed in other ways (for the blocking detection operation 6C), or it is directly considered that there is blocking and a blocking warning is displayed, for example, to warn the user that the object in the image is blocked.

For the blocking detection operations 2C to 6C, the blocking condition may be as follows. If the number of skeleton parts which fulfill the predetermined blocking degree reaches a predetermined threshold number of skeleton parts or the blocking degree of the set skeleton parts fulfils the set blocking degree, it is determined that the condition of providing a blocking warning or a blocking notification is fulfilled.

The determination whether the blocking degree of the set skeleton parts satisfies the set blocking degree may be determined as follows. The number of blocked bone nodes (undetected bone nodes) in the skeleton part is not less than a predetermined threshold. The set blocking degree may be predetermined or set according to at least one of the user settings, the scene information corresponding to the image and the device status information. For example, when it is set by the user that the number of blocked bone nodes in each skeleton part is greater than zero, it is considered that the set blocking degree is reached. That is, it is considered that there is a blocking as long as there is an undetected bone node. Alternatively, when the photographing scene corresponding to the image is multi-person photographing, it may be considered that there is a large blocking. In this case, it is considered that the set blocking degree is reached as long as the number of blocked bone nodes is not less than one.

The set skeleton parts above may also be set according to at least one of the user settings, the scene information corresponding to the image and the device status information. The skeleton parts may be preset according to the user settings. For example, the skeleton parts, which are preset by the user, include the eye skeleton part, the nose skeleton part, the ear skeleton part, the shoulder skeleton part, etc. The skeleton parts may be automatically set. For example, the parts, which the user may be concerned about, are determined according to the photographing scene corresponding to the image. For example, when a photo containing multiple persons is taken, the user may be concerned about the eyes, the nose and the ears most, and thus the set skeleton parts include the eye skeleton part, the nose skeleton part and the ear skeleton part.

In an embodiment of the disclosure, corresponding blocking levels may be set, according to the skeleton parts and the blocking degree of the skeleton parts in advance. When it is detected that the current detection result reaches a set or predetermined blocking level, it is considered that the condition of providing a blocking warning is fulfilled.

Further, the content of the blocking warning includes whether the object is blocked and/or information about the blocked position, for example, the name of the blocked skeleton parts or bone nodes. The content of the blocking warning may also include pose adjustment advice, for example, how the object is to be adjusted to avoid blocking. For example, the pose adjustment advice may include how to rearrange the bone nodes to avoid blocking. The skeleton parts mentioned above include at least one of an eye skeleton part, an ear skeleton part, a nose skeleton part, a shoulder skeleton part, an elbow skeleton part, a wrist skeleton part, a waist skeleton part, a knee skeleton part or an ankle skeleton part. Each of the skeleton parts corresponds to at least one bone nodes.

In an embodiment of the disclosure, the process of performing blocking detection based on the skeleton information and automatically warning the blocking of the object in the image may include the following processing.

The system automatically performs pose estimation on the image, and when there are human objects in the pose estimation result, functions of blocking detection and warning are automatically triggered.

The system determines the identified human skeletons one by one, and if all the bone nodes of a skeleton are detected, that is, the number of detected bone nodes is, for example, seventeen (17), it may be determined that this person is not blocked. In another embodiment, the blocking of this person is deduced according to a user-defined threshold level.

Figure 11:
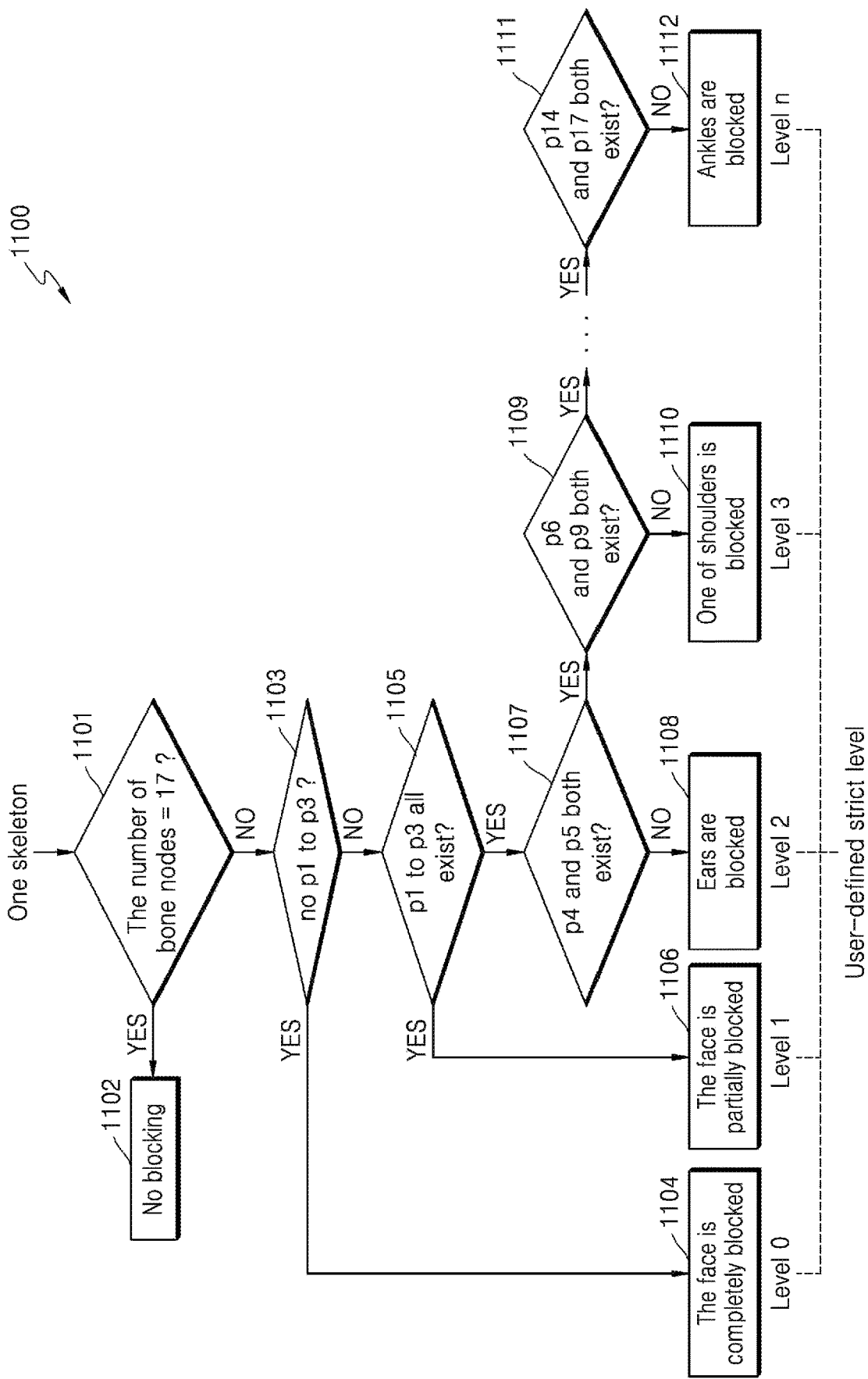
FIG. 11 is a flowchart illustrating determining a blocking with respect to a single skeleton according to an embodiment.

FIG. 11 is a flowchart illustrating deducing blocking of a single skeleton according to an embodiment of the disclosure.

Referring to FIG. 11, the deduction is performed according to the following order. Although the overall bone nodes of one human body is determined to be seventeen (17) in this embodiment, the user may select a different number of overall bone nodes of one human body in accordance with another embodiment of the disclosure.

First, if the number of bone nodes is equivalent to a predetermined number, i.e. seventeen (17), it is determined that there is no blocking in operation 1101 and 1102.

Operation 1D: If bone nodes p1 to p3 (which respectively correspond to bone nodes 1 to 3 in FIG. 9, hereinafter) are not detected in operation 1103, it is determined that the face of this person is completely blocked and the current situation corresponds to level 0 in operation 1104. Otherwise, operation 2D is performed.

Operation 2D: If all of bone nodes p1 to p3 are all not detected, i.e., bone nodes p1 to p3 all do not exist, in operation 1105, it is determined that the face of this person is partially blocked (operation 1106) and this situation corresponds to level 1 in operation 1104. Otherwise, operation 3D is performed.

Operation 3D: If bone nodes p4 and p5 are both not detected, i.e., bone nodes p4 and p5 both do not exist, in operation 1107, it is determined that ears of this person are blocked in operation 1108. Otherwise, operation 4D is performed.

Operation 4D: If bone nodes p6 and p9 are both not detected, i.e., bone nodes p6 and p9 both do not exist, in operation 1109, it is determined that one of shoulders of this person is blocked in operation 1110. The device may be able to recognize which of the shoulders between the left shoulder or the right shoulder based on the detected nodes among P6 and P9.

Operation (N+1)D: If bone node p14 and bone node p17 are not detected, i.e., bone nodes p14 and p17 both do not exist, in operation 1111, it is determined that ankles of this person are blocked in operation 1112.

In this method, it is determined which of the bone nodes are blocked from among the overall seventeen bone nodes. The user may customize the threshold level, or the terminal device may set the threshold level according to the user setting, the scene information corresponding to the image and/or the device status information. For example, when the scene corresponding to the current image is multi-person photographing, the threshold level may be set as level 2 and when the power capacity of the device is sufficient and computing resources are enough, the threshold level may be set as level 6.

The threshold level to which the current blocking belongs, is deduced successively according to the detected blocked bone nodes. When the threshold level, to which the current blocking belongs, is not greater than a set threshold level L, a corresponding blocking warning is provided and the detection may be stopped. Then, the deduction process is terminated and the blocking deduction for the next skeleton is performed.

The number of blocked objects in the image is generally quite less than that of non-blocked or non-obscured objects in the image. That is, generally, the blocked objects, which are deduced by the system according to the set threshold level, should not exceed n % of the total objects, where, n ∈ (0, 100), generally, n>50. Therefore, the system may rank, according to the deduction result, the objects from high to low levels corresponding to blocking of the objects. The first n % objects are considered not to be blocked. In this case, the corresponding threshold level Ln (which is determined according to n %) is the optimal threshold level determined by the system at this time. The user may reset the threshold level at any time, and may select the threshold level recommended by the system. If the threshold level set by the user is higher than the optimal threshold level Ln deduced by the system, it is considered that the threshold level set by the user is too high, and the user is advised to reduce the threshold level.

Here, when determination of on blocking of multiple bone nodes is involved in the levels, the levels may be subdivided according to the requirement of the user. For example, for the deduction 3, it may be set that, only when both bone nodes p4 and p5 of two ears are not detected, it is considered that ears are blocked. Otherwise, it is considered that ears are not blocked and the deduction 4 is performed. Similarly, the deductions 4 and 5 may be further subdivided and will not be repeated here.

If the system deduces that there is a blocking in the image, the system automatically prompts the blocked part of a human body included in the image, or may prompt the user to capture image again. This greatly saves time for the photographer to intuitively confirm the blocking relation. In addition, the way of automatically prompting may be one of or a combination of any one of voice warning, circling or highlighting the blocked parts.

Figure 12:
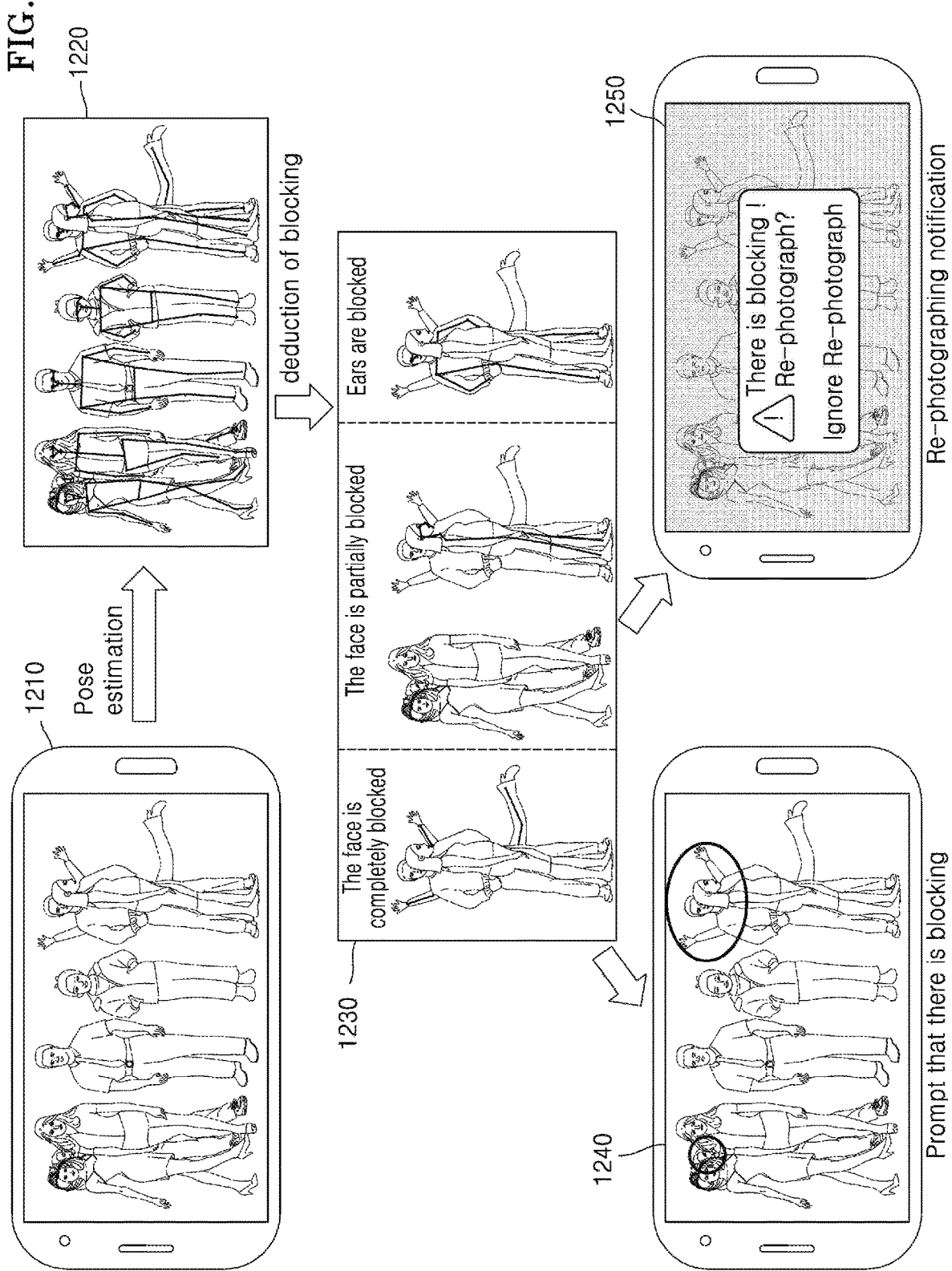
FIG. 12 illustrates a schematic view of processing a blocking in multi-person photographing according to an embodiment.

FIG. 12 illustrates a schematic view of processing blocking of multi-person photographing according to an embodiment.

Referring to FIG. 12, when an image containing multiple persons are is captured in operation 1210, the capturing device or a server connected to the capturing device (collectively, a system) may automatically identify human skeleton information in the image, separates a skeleton to which each bone node and bone node vector belong, and then considers each skeleton to detect a blocking of any node for each person in the image and make blocking deduction in operation 1220. If it is determined that there is a blocking such as the face is completely blocked, the face is partially blocked, or the ears are blocked in operation 1230, the system may automatically prompt a notification that there is a blocking and may indicate the blocked parts in operation 1240. When the user takes a photo, the system indicates the blocked parts in the taken photo and provides the user with an advice for retaking a photo (re-photographing) in operation 1250. The user may choose to ignore or retake a photo. For example, the re-photographing advice may be "there is a blocking, re-photograph?" When the user selects "re-photograph", the photographing function is automatically started for re-photographing. Otherwise, when the user chooses to ignore the advice, no re-photographing operation will be performed, and the re-photographing advice will not be displayed anymore. If there is a blocking within the range of threshold levels set by the user, the blocking may be indicated. During the photographing, the blocking warning may be a hint. If there is a blocking in the photo taken by the user, the system indicates the blocking, and the user may choose to ignore or re-photograph.

In an embodiment of the disclosure, by detecting whether the object is blocked according to bone nodes obtained by performing pose estimation on the object, the blocking of the face may be detected. Also, the blocking of other key parts of the body such as shoulders, legs, and/or arms may be detected.

In an embodiment of the disclosure, in the case of multi-person photographing, at least one body part of a person may be blocked by another person. When bone nodes of objects are detected, not only positional information of bone nodes of the objects is extracted, but also vector information of bone nodes is extracted. Objects, to which bone nodes belong, may be determined according to the vector information. In multi-person photographing, multiple objects and bone nodes of each object may be accurately detected. Therefore, according to an embodiment, it is possible to determine whether the objects or a part of the objects are blocked according to the detected bone nodes. Also, according to an embodiment, it is possible to detect blocking of objects by detecting unobscured key points of a skeleton in an image, even though the face of a person in an image is blocked and only the legs and arms of the person are visible. Thus, according to an embodiment of the disclosure, the accuracy and flexibility of blocking detection is greatly improved. Additionally, according to an embodiment, a skeleton in an image may be accurately detected even when a user taking the image is at a far distance.

In an embodiment of the disclosure, the pose detection is performed based on the skeleton information of the object.

In an embodiment, the pose detection may include performing, according to a positional relation between bone nodes in the skeleton information, pose detection with respect to the object. According to another embodiment, the pose detection may be performed based on detected key points and vectors between them.

Specifically, the performing of the pose detection on the object includes at least one of detecting, according to a positional relationship between bone nodes of the shoulder skeleton part, whether shoulders of the object are aligned, for example, the situation a where the human pose needs to be adjusted, detecting, according to a positional relation between bone nodes in the eye skeleton part and bone nodes in the shoulder skeleton part, whether the head of the object is in a regular pose, and determining that the human pose needs to be adjusted based on the detection.

The pose detection may further include detecting, according to a positional relationship between bone nodes in the nose skeleton part and bone nodes in the shoulder skeleton part, whether the face of the object is in a regular pose, and determining that the human pose needs to be adjusted based on the detection.

The pose detection may further include detecting, according to a positional relationship between bone nodes in the eye skeleton part and bone nodes in the nose skeleton part, whether the head of the object is in a regular pose and determining that the human pose needs to be adjusted.

After a pose detection result is obtained, a corresponding pose correction warning is output based on the detected pose detection result.

The outputting of the pose correction warning may include outputting, based on the pose detection result, the pose correction warning, and/or correcting, based on the pose detection result, the pose of the object.

In an embodiment of the disclosure, the performing pose detection based on the skeleton information includes the following operations.

The system automatically performs pose estimation with respect to the objects in an image, and when human objects are detected in the image according to the pose estimation result, functions of issuing a pose correction warning and automatic correction are automatically triggered.

When a single-person photo is taken, more attention is generally paid to human pose information. For example, when the number of detected bone nodes is less than seventeen (17), the system may automatically trigger the human pose correction function without triggering the blocking detection function. Especially when an identification photo is taken, the upper part of the human body is usually expected to be in a regular pose. In the disclosure, the system may accurately calculate positions of all human bone nodes in the image according to the human pose estimation result. Next, the system may calculate relative positions and angles of related bone nodes in the image, i.e., a positional relationship between the bone nodes, determine whether human poses are normal according to the positional relationship, and issue an advice for adjusting poses or automatically perform pose correction in the image. Unless otherwise specified, positions and vectors of bone nodes described below are positions and vectors of bone nodes in an image plane.

In an embodiment, in the case of pose detection with regard to multiple persons, the pose detection includes only one-time detection, and accordingly, even where there are many people in a photo, the pose detections is fast.

Figure 13:
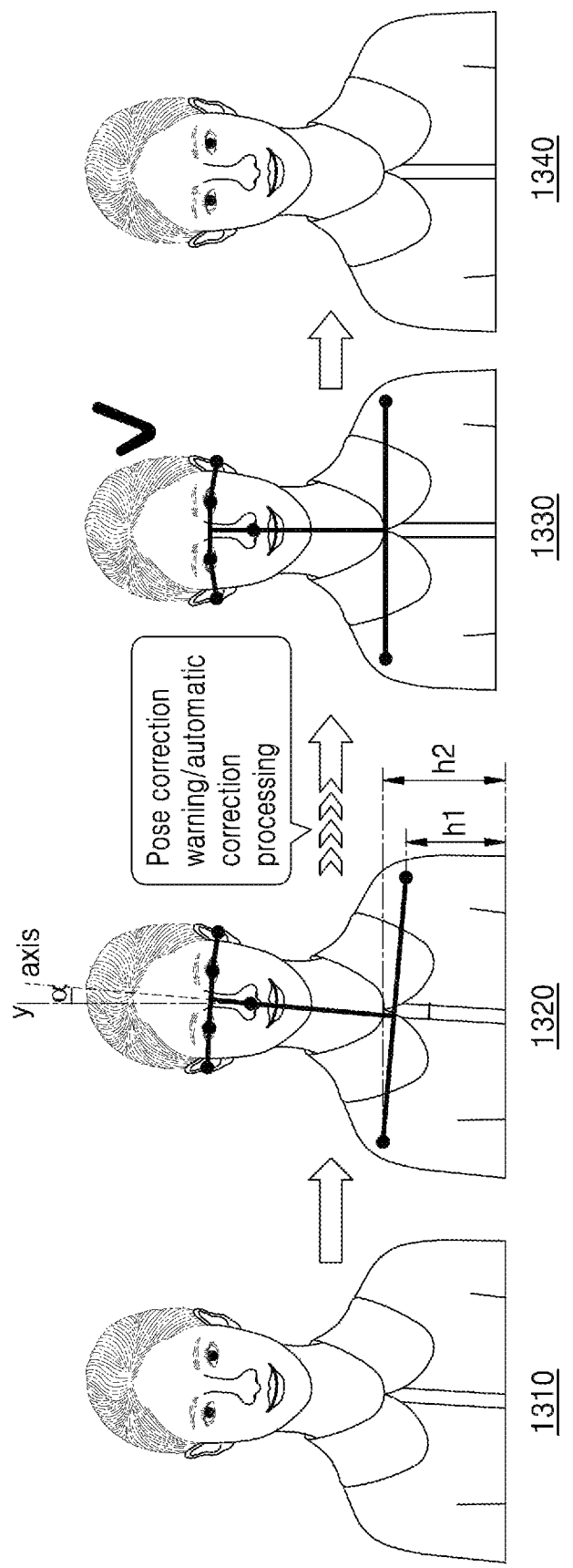
FIG. 13 is a schematic view of pose correction advice according to an embodiment.

FIG. 13 is a schematic view illustrating issuance of pose correction advice according to an embodiment.

Referring to FIG. 13, the system considers determining whether an object pose needs to be adjusted because the detected heights of bone nodes representing the shoulders of the object in the image in the vertical direction are $h_1$ and $h_2$ (where, $h_1 \neq h_2$). Based on a result of the determining, the system gives issues a pose correction warning by as a voice signal or an operation pop-up text. For example, the system may prompt the user to inform the person in the image to raise the right shoulder. The system may also estimate an adjustment amount of the right shoulder of the object as ($h_2-h_1$) according to a heights difference between $h_1$ and $h_2$ of bone nodes in the vertical direction in a 3D spatial image. In addition, the system may obtain a vector $l_{axis}$ which is perpendicular to a line between bone nodes at the shoulders according to detected positions of bone nodes p6 and, p9 corresponding to the shoulders, and calculate a rotation amount $\alpha_1$ of the human body in the image plane, where$\alpha_1 > \alpha_{threshold}$. The system may automatically advise the user that the camera is not in the right position and that it is necessary to rotate the camera clockwise or make the human body in the 3D spatial image rotate counterclockwise.

Alternatively, the system may perform automatic correction according to user's requirements or user's settings. For example, the system may automatically perform rotation correction with respect to the 3D spatial image, that is, rotates the 3D spatial image counterclockwise or clockwise in real time. The vector $l_{axis}$ is the central axis of the human skeleton, the angle $\alpha_1$ is an acute angle between the vector $l_{axis}$ and the vertical direction y of the image, and $\alpha_{threshold}$ may be a predetermined threshold value set by the user.

In an embodiment of the disclosure, the central axis of the human skeleton is the vector $l_{axis}$, $\alpha_{threshold}$ may be controlled according to the fixed level set by the user, and all threshold values represented by $\alpha_{threshold}$ may be set to be the same value or different values as required. All operations prompted by the system refer to the relative positions in the current image.

Situations where the human pose needs to be adjusted may include, but are not limited to, several situations when the shoulders not aligned, the head is tilted, the face is oriented in a sideway direction, for example in a left or right direction, and the head is up or down, etc.

Figure 14A:
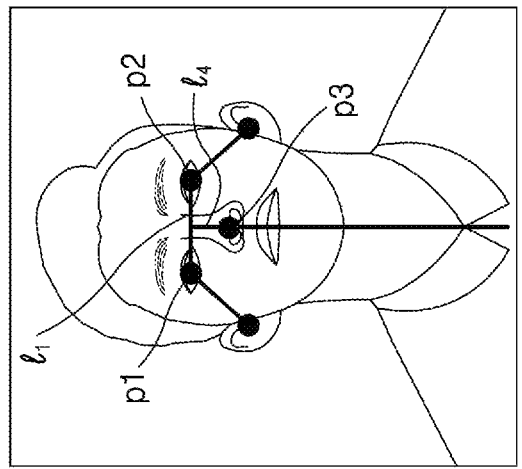
FIG. 14A illustrates a schematic view of poses required to be corrected according to an embodiment.

FIG. 14A illustrates a schematic view of poses required to be corrected according to an embodiments.

a. Shoulders are not aligned

Referring to FIG. 14A, the system may calculate, according to the detected positions p6 and p9 of bone nodes in the object, the heights $h_1$ and $h_2$ from the bottom of the image. When $h_1 \neq h_2$, it is considered that the shoulders of the human body in the image are not aligned. In this situation, the system may determine that the human pose needs to be adjusted. Then, the system may automatically trigger the function of providing a pose correction warning to issue advice on the adjusting the heights of the shoulders or the function of correcting the pose by making $h_1 = h_2$.

b. Head is tilted

Referring to FIG. 14A, the system may calculate, according to lines $l_1$ and $l_2$ between the detected positions p1 and p2 of the bone nodes corresponding to eyes in the image, an angle $\alpha_2$. when $\alpha_2 > \alpha_{threshold}$, it is considered determined that the human head in the image is not in a normal pose. In this situation, the system may determine that the human head is tilted and the human head pose needs to be adjusted. Then, the system may automatically trigger the function of issuing a pose correction warning to give advice on the adjustment of angle of the head in the image plane or the function of correcting the pose by making $\alpha_2 \leq \alpha_{threshold}$. The system may issue a voice correction statement of "please raise the left side of the head" or may display the same message on a display of an electronic device. The message may include the degree of tilting in accordance with the calculated tilted angle as noted above.

c. Face is in a sideway direction to the left or right

Figure 14B:
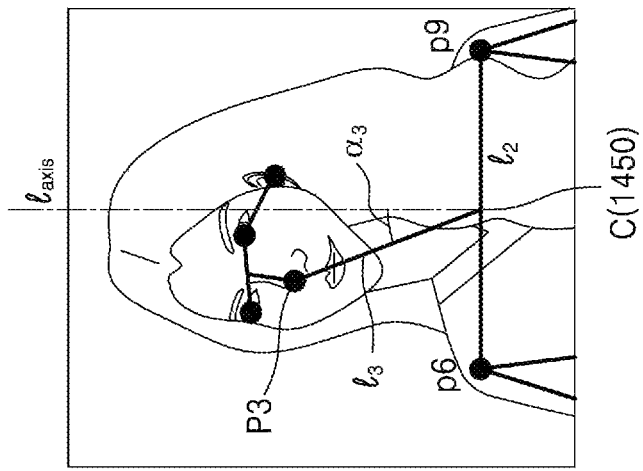
FIG. 14B illustrates a schematic view of poses required to be corrected according to an embodiment.

FIG. 14B illustrates a schematic view of poses required to be corrected according to an embodiments.

Referring to FIG. 14B, the system may obtain, according to the detected position p3 of the bone node corresponding to the nose of the human body and positions p6 and p9 of the bone nodes corresponding to the shoulders of the human body in the image, a vector $l_3$ from p3 to a middle point of a line $l_2$ between the positions p6 and p9. The system may calculate an angle $\alpha_3$ between $l_3$ and the central axis $l_{axis}$ of the human skeleton. When $\alpha_3 > \alpha_{threshold}$, it is considered that the human head in the image is turned into a one sideway direction. The actual sideway direction, to in which the face is turned, is obtained according to the position of p3 relative with respect to the middle point c 1450 located at the middle of $l_2$. If p3 is determined to be located on the left of the point c, it is determined that the face is turned to the left. If p3 is determined to be located on the right of the middle point c 1450, it is determined the face is turned to the right. In this case, the system may determine that the human pose needs to be adjusted. Then, the system may automatically trigger the function of providing a pose correction warning to provide an advice of for turning the head to make turn the face into a regular pose or the function of correcting the pose by making $\alpha_3 \leq \alpha_{threshold}$. The system may issue a voice correction statement of "please turn your head to the left" or may display the same message on a display of an electronic device. The message may include the degree of turning in accordance with the calculated angle $\alpha_3$ as noted above.

d. Head is tilted up/down

Figure 14C:
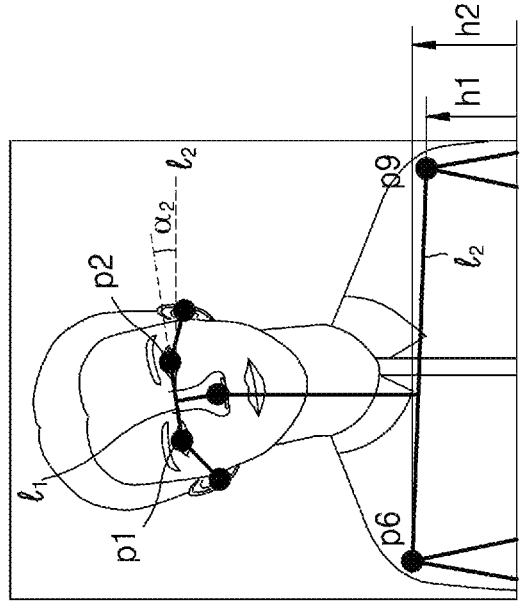
FIG. 14C illustrates a schematic view of poses required to be corrected according to an embodiment.

FIG. 14C illustrates a schematic view of poses required to be corrected according to an embodiments.

Referring to FIG. 14C, the system may obtain, according to the detected positions p1 and p2 of the bone nodes corresponding to the eyes and position p3 of the bone node corresponding to the nose in the image, a vector $l_4$ from p3 to a middle point of a line $l_1$ between p1 and p2, and may calculate $k = l_1/l_4$. When $k > k_{threshold0}$, it is considered that the human head chin in the image is raised too high. When $k < k_{threshold1}$, it is considered that the human head chin in the image is lowered too much. In this case, the system may determine that the human pose needs to be adjusted. Then, the system may automatically triggers the function of providing a pose correction warning to give advice for slightly adjusting the head chin upwards or downwards. The value of $k_{threshold0}$ is a critical value indicating that the chin is posed too high and the value of $k_{threshold1}$ is a critical value indicating that the chin is posed too low. When a value of the ratio k when the human pose is regular is $k_0$, $k_{threshold0} = k_0 + \varepsilon_0$, and $k_{threshold1} = k_0 - \varepsilon_1$ where $\varepsilon_0$ and $\varepsilon_1$ are two thresholds controlled according to threshold levels set by the user.

The system may issue a voice correction statement of "please make your chin down" or may display the same message on a display of an electronic device to correct the pose. The message may include the degree of correcting the pose in accordance with the calculated $k = l_1/l_4$ as noted above.

During the photographing by the user, the image in the camera is a mapping of the scene seen through the camera lens. Therefore, the same adjustment as applied to the image may be applied to the camera in a similar way by adjusting a corresponding amount in a reverse direction. That is, if an adjustment by a clockwise rotation amount is applied with respect to the skeleton in the image, it may be determined that is the camera may undergo a counterclockwise rotation by the same clockwise rotation amount. If the face is turned to the left in the skeleton in the image, it may be determined that the camera may be turned to the right. Likewise, if the head is tilted up in the skeleton in the image, it may be determined that the position of the camera is too low. Thus, when advice on adjusting of the human body is given, the same advice may be given with respect to the camera, but in a reverse direction.

In an embodiment of the disclosure, the system may automatically correct poses based on the human pose detection result, to obtain an image where the human poses are regular.

FIG. 15 illustrates a schematic view of correcting a pose according to an embodiment.

Referring to FIG. 15, the system may obtain a human pose by pose estimation, and may divide the human body into parts based on the pose estimation in operation 1510. A 3D model of the human body may be established according to the human pose and corresponding textures. In the 3D space, the pose of the 3D model of the human body is corrected in operation 1530 and then mapped to a corresponding region in a 2D image to obtain an image having the regular human pose in operation 1550.

When multiple persons are photographed, that is, when there are multiple photographed objects, since poses of the photographed objects need to be regular in some occasions, a pose correction warning may be given to the photographed objects in the image one by one or automatic correction is performed.

The pose correction warning according to an embodiment of the disclosure includes a warning whether to perform correction and/or provide pose correction advice.

In an embodiment of the disclosure, pose correction is performed according to bone nodes of each of the objects. When the face is completely blocked, in other words, when only the legs/arms of an object are shown, the capturing device may still detect the object according to bone nodes including other key parts of the object. This operation greatly improves the accuracy and flexibility of blocking detection.

In an embodiment of the disclosure, pose estimation is performed based on the bone nodes. Even if an object is far away from the capturing device, bone nodes at key parts of the object may be accurately detected.

The pose detection described above based on the skeleton information of the object may further include performing, based on the skeleton information of the object and skeleton information of an associated object associated with the object, pose consistency detection with respect to the object and the associated object.

Further, the performing of pose consistency detection with respect to the object and the associated object may include acquiring bone node vectors of the object and the associated object in a set 3D space, determining similarity between the bone node vectors corresponding to the object and the associated object, determining, based on the similarity between the bone node vectors, pose similarity between the object and the associated object, and detecting, according to the pose similarity, pose consistency between the object and the associated object.

Further, in the case of a video segment to which the image belongs and according to a pose consistency detection result between the object and the associated object in each image in the video segment, pose consistency detection is performed with respect to the object and the associated object.

After a pose detection result is obtained, corresponding processing may be performed based on the detected pose detection result, specifically including photographing and/or outputting pose adjustment information based on the pose detection result.

The associated object is a preset object in a standard pose and/or, if skeleton information of at least two objects is detected in the image, the at least two objects are associated with each other.

In an embodiment of the disclosure, the pose detection based on the skeleton information may include pose consistency detection of multi-person photographing poses and automatic triggering of a photographing function (i.e., automatic capturing).

When multiple persons are photographed, that is, when there are multiple photographed objects, the user generally expects that poses of the multiple photographed objects be consistent in some occasions, or wants to capture the multiple persons having consistent or similar poses. In an embodiment, when the system acknowledges from the pose estimation result that the photo contains multiple persons, the system may trigger the pose consistency function.

The detected objects in the image are associated with each other. For example, when the detected objects include an object 1, an object 2 and an object 3, the object 2 and the object 3 are associated objects of the object 1, the object 1 and the object 3 are associated objects of the object 2, and the object 1 and the object 2 are associated objects of the object 3.

In an embodiment, the system may calculate the similarity of bone node vectors corresponding to multiple skeletons based on an evaluation standard for multi-person pose consistency according to the detected positions of the bone nodes of the objects in the 3D space.

Figure 16B:
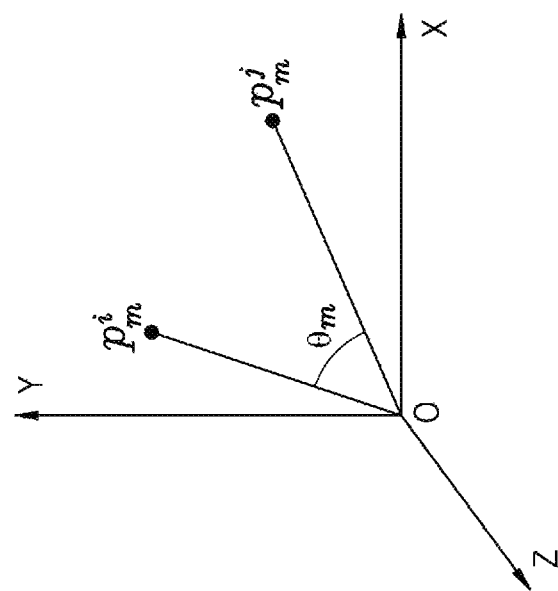
FIG. 16B illustrates a method of measuring pose consistency between two skeletons according to an embodiment.
Figure 16A:
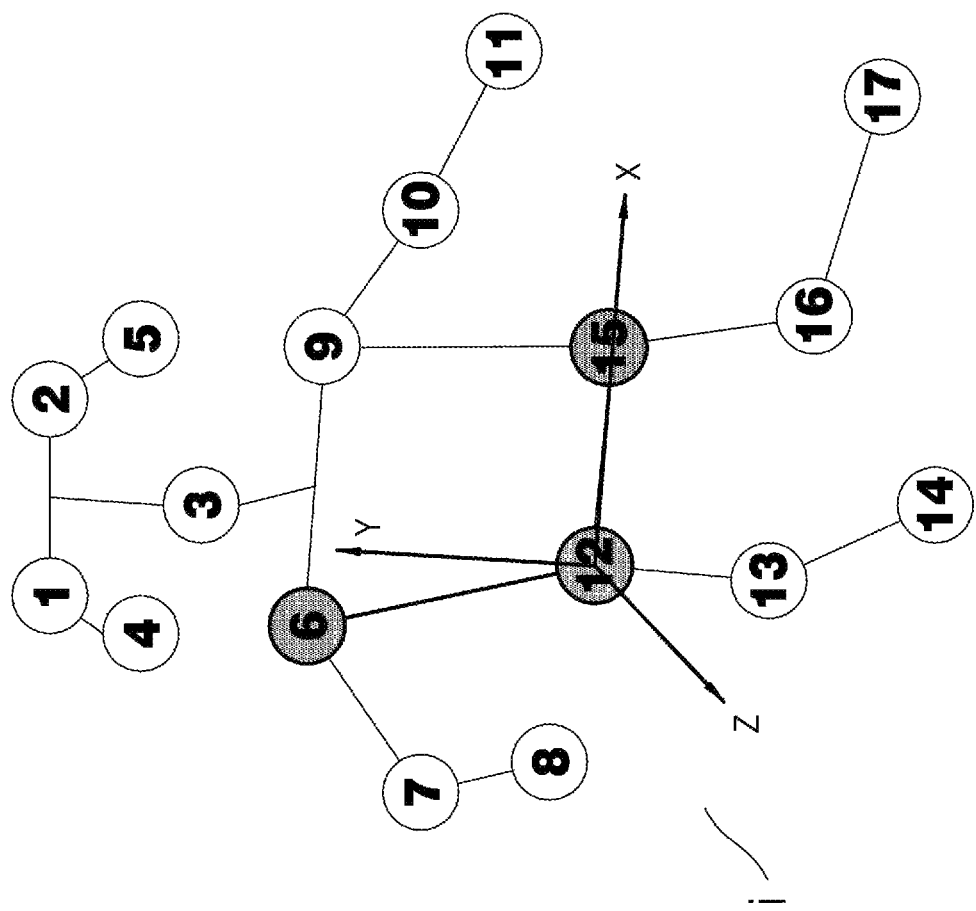
FIG. 16A illustrates a method of measuring pose consistency between two skeletons according to an embodiment.

FIG. 16A illustrates a method of measuring pose consistency with respect to two skeletons according to an embodiment.

Referring to FIG. 16A, for each skeleton i, a plane formed by three points (i.e., bone nodes p6 (or p9), p12 and p15) is used as the skeleton plane, and a vector of a line between p12 and p15 is used as the X-axis. A Cartesian coordinates system XYZ is established, and coordinates of all bone nodes in the skeleton i are transformed into this space (which may be referred to as a set 3D space) to obtain corresponding bone node vectors, that is, bone node vectors of any one of objects and the associated object in the set 3D space are acquired. The similarity of corresponding bone node vectors between every two skeletons in the image is calculated, that is, the similarity between bone node vectors corresponding to any one of objects and the associated object is determined, and then a weighted average of the similarity of two skeletons is obtained. Also, the average of the similarity between skeletons is considered as the similarity between multiple skeletons, i.e., the consistency score of poses among the multiple persons. That is, the pose similarity between any one of objects and the associated object is determined based on the similarity between bone node vectors, and the pose consistency between the object and the associated object may be detected according to the obtained pose similarity.

A plane formed by any other three bone nodes in the skeleton may be selected as the skeleton plane, but it is necessary to ensure that each skeleton may include three bone nodes to form the skeleton plane. The last bone node connected to a bone node may be used as the origin of bone node vectors.

FIG. 16B illustrates a method of measuring pose consistency with respect to two skeletons according to an embodiment.

Referring to FIG. 16B, considering the bone node p8 as an example, the similarity between vectors /$p^i_7 p^i_8$ and /$p^j_7 p^j_8$, which have the bone node p7 as the origin, may be calculated as the degree of similarity between corresponding to bone node vectors of two skeletons. For the sake of illustration, the point O represents the last bone node connected to the bone node, and is used as the origin of the Cartesian coordinate system for bone node vectors for calculating the similarity among bone node vectors.

Specifically, $p^i_m$ and $p^j_m$ are respectively bone nodes $p_m$ (m=1, 2, . . . , 17) of skeletons i and j, and O is the origin of vectors and is generally the last bone node connected to $p_m$. The similarity between vectors $\overrightarrow{Op^i_m}$ and $\overrightarrow{Op^j_m}$ is:

$$\cos\theta_m = \frac{\overrightarrow{Op^i_m} \cdot \overrightarrow{Op^j_m}}{\|\overrightarrow{Op^i_m}\|\|\overrightarrow{Op^j_m}\|}$$

then, the similarity between skeletons i and j is:

$$S_{ij} = \Sigma_m^{16} 12 W_m (\cos\theta_m + 1)/2$$

then, the similarity between multiple skeletons in the image, i.e., the consistency score of the poses of the multiple persons, is:

$$S = \frac{2}{N(N-1)} \sum_{i=1}^{N} \sum_{j=i}^{N} s_{ij}$$

In the equation above, N (N>1) is the number of skeletons in the image $W_m$ is a weight coefficient of the current bone node, which is set by the system and may be set by the user for controlling the important degree of each bone node in calculating the similarity, and $i_{m=1}^{17} W_m = 1$.

The weight coefficient of bone nodes may be a weight coefficient which is set according to an importance degree of bone nodes. In calculating the similarity, only the weight of the current bone node may be considered and the weight of the current bone node may be obtained by adding or averaging the weights of two bone nodes forming one vector.

In an embodiment, when the system detects that the pose consistency score of the poses of the multiple persons in the image reaches a threshold value set by the user, the photographing function of the camera may be automatically triggered to automatically capture instantaneous images or a prompt may be provided to the user according o the detection result.

FIG. 17A illustrates a procedure of detecting a consistency of poses for multiple persons according to an embodiment.

Referring to FIG. 17A, when the user captures an image when multiple persons are jumping, the system automatically detects the pose of each skeleton in the image and calculates the pose consistency score S of all skeletons. If S is greater than the score corresponding to the threshold level set by the user, a sequence of images is automatically captured, and then one or more images with the greatest consistency score are selected from the captured images as candidates which are then recommended to the user. For example, the object 1710 in the image in FIG. 17A may have score S of all skeletons and may exceed a threshold value corresponding to the threshold level set by the user and the object 1710 may be determined to have different jumping pose from other jumping poses in the image.

FIG. 17B illustrates a procedure of detecting a consistency of poses for multiple persons according to an embodiment. Referring to FIG. 17B, if the consistency score S is less than the score corresponding to the threshold level set by the user, that is, there are a few persons whose poses are different from those of others, the system may provide a prompt or a pop-up to the user to assist the user to capture an image where the poses of the multiple persons become consistent. In addition, the system may assist the user by circling inconsistent skeletons such as the circled object 1730, or prompting the user by voice or a text message, or providing reference poses for inconsistent poses in order to help the photographed objects to quickly realize consistent poses.

According to an embodiment of the disclosure, when the similarity between bone node vectors corresponding to the objects is determined, the similarity may be determined for all bone node vectors, or it may be determined whether the poses of the objects are consistent only based on the similarity between key bone node vectors. If the poses of the objects are consistent, image capturing is performed. For example, when poses of the legs of all objects are consistent, image capturing may be performed even though poses of arms are inconsistent. The key bone node vectors may be preset by the user or may be automatically determined according to poses of objects.

According to an embodiment of the disclosure, it is unnecessary to preset capturing poses and image capturing may be automatically performed immediately when poses of multiple objects are consistent. This improves the flexibility and convenience of user photographing.

Figure 18A:
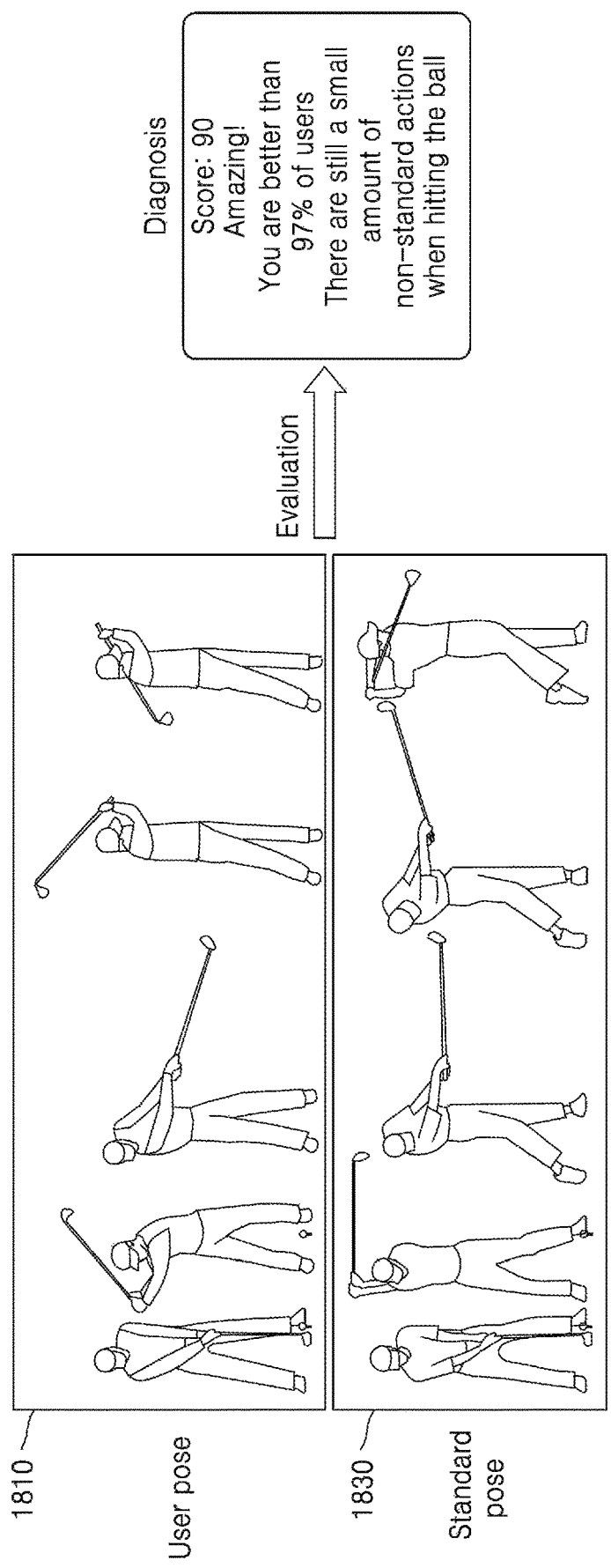
FIG. 18A illustrates scoring sports poses based on pose estimation according to an embodiment.

FIG. 18A illustrates scoring user's poses based on pose estimation according to an embodiment.

Some sports such as golf or tennis may require players to have accurate or standard poses. In the disclosure, players' poses may be evaluated and adjustment advice with respect to the poses may be provided to the user.

In an embodiment of the disclosure, an object in a standard pose 1830 may be preset for a certain sport, and the pose of the object in a standard pose is considered as the standard pose. If a player wants to evaluate his/her sport pose 1810 or acquire adjustment advice, the system may perform pose estimation with respect to the player based on the image to obtain skeleton information. Next, the system may perform pose consistency detection with respect to the player and the object in a standard pose based on the skeleton information of the player and the object in a standard pose. The system may then provide the pose estimation result of the player and/or the pose adjustment advice of the player according to the pose consistency result.

When a video captured for the player is processed, pose consistency detection may be respectively performed on each image frame in the video of the player. Then, the pose consistency detection result corresponding to the video is obtained according to the detection result of each image frame and the weight of each image frame of the video.

The video may be considered as a sequence of images. Therefore, the standard degree of the pose of the player may be scored by identifying the similarity between the pose of the player in each image frame and the standard pose. In addition, the system may extract key frames in the video according to algorithms related to extraction of key frames of the video. The system may assign great weights to these key frames and perform weighted averaging on the consistency scores of all frames to obtain the final evaluation score of the pose of the player. The system may mark the non-standard gesture of the player according to the user's requirements, or may obtain a difference or a degree of difference from the standard pose based on the pose consistency detection result.

Referring to FIG. 18A, if the number of image frames in which the player is playing golf is n, the system may perform pose estimation with respect to each frame and may respectively perform pose consistency evaluation between the pose of the player and the standard pose to obtain a sequence of scores.

In an embodiment, when the user captures a video, the beginning of video may include redundant frames. To erase or ignore the redundant frames, key frames in the standard video are determined, for example, frames ($F_0, F_1, \ldots, F_n$) of the beginning, ending and middle key gestures. In each image frame in the video taken by the user, image frames ($F_0', F_1', \ldots, F_n'$) corresponding to key frames in the standard video are determined by calculating the similarly between skeletons. Image frames in the standard video, corresponding to image frames between every two key frames, are determined by a linear difference. Thus, image frames in the standard video, which correspond to all image frames in the video taken by the user, are determined. The similarity between skeletons is calculated frame by frame, and then the pose of the user is scored.

Figure 18B:
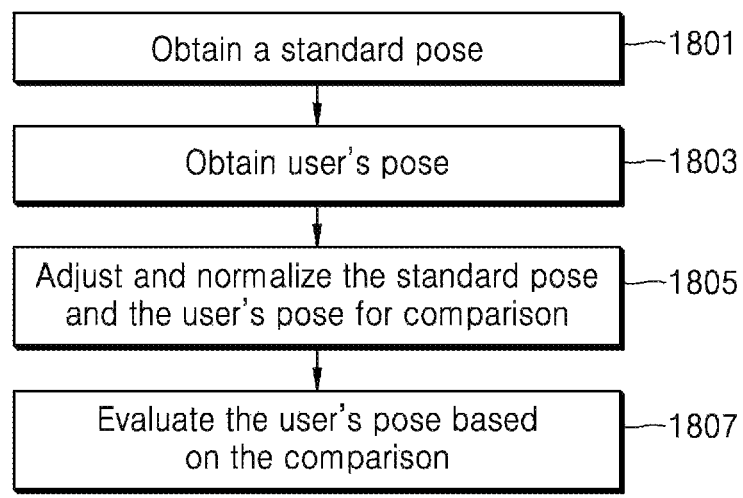
FIG. 18B illustrates a flowchart of scoring based on comparing the standard pose with the user pose.

FIG. 18B illustrates a flowchart of scoring based on comparing the standard pose with the user pose. In operation 1801, the user acquires a standard pose. The standard pose may be, for example, a golf swing pose shown in FIG. 18A. In another embodiment, the standard pose may be a bat swing pose of a professional baseball player, a swimming player's swim pose, a yoga pose, a pose of using a weight machine, and the like. A dance pose may be another example of a standard pose as well.

In operation 1803, the user obtains images of a user's pose that may be similar to the obtained standard pose. In operation 1805, the image streams of a standard pose and the image streams of the user pose may be adjusted, normalized, and synchronized for comparison between the two. In other words, the start point and the end point of the two poses—each of two streams of images—are synchronized for a precise and accurate comparison between the standard pose and the user pose. Moreover, the size of objects in the two streams of images may also be normalized and adjusted for an accurate comparison.

In operation 1807, based on the comparison between the skeleton information of the standard pose and the skeleton information of the user pose, the degree of user pose accuracy may be evaluated and scored. In an embodiment, as described referring to FIG. 18A, the length and/or the angle made using nodes are detected and compared with a predetermined threshold value. The comparison result may represent whether the user pose is close to the standard pose and how much close the user pose is.

In an embodiment of the disclosure, content adjustment is performed based on the skeleton information of the object. The content adjustment includes content replacement, content adding, content deletion, and content adjustment based on virtual information.

The content replacement further includes establishing a 3D model according to the skeleton information of the object in the image, determining a corresponding region of content to be replaced in the 3D model, mapping the content to be replaced to the corresponding region, and mapping the corresponding region of the 3D model to a corresponding position of the source image.

Content adjustment based on virtual information may include adding AR items, determining a 3D model after the AR items are added, and mapping the changed 3D model into a 2D model to realize interactions between virtual items and human poses.

In an embodiment, the content adjustment based on the skeleton information may include the following operations.

The user generally needs to perform post-processing on the photographed image to obtain some special effects. In the disclosure, during the photographing, the user may obtain some special photographing effects related to human poses in real time. For example, texture related to human poses may be replaced such as skin or clothes of human in the image, or the user may want to take a photo containing both persons and AR items, add, and/or remove decorations.

Specifically, during user photographing, the system may acquire 3D space coordinates of related bone nodes according to the pose estimation result of the object in the current image and adjust the positions of bone nodes in the 3D model of the human body to obtain a 3D model of the current pose of the human body in the image. A mapping relation between corresponding regions, where textures need to be replaced, divided from the image and replaced textures is established, and thus texture replacement (corresponding to content replacement) of human poses is realized via the 3D model and the parameterization result. The slight deformation on the surface where the 3D model interacts with virtual items (which may be referred to as virtual information) is mapped to the 2D image to obtain a photographing experience with more vivid interactions with virtual items (corresponding to content adjustment based on virtual information).

a. Texture replacement (textures may be referred to as content, hereinafter)

A correspondence between regions where textures need to be replaced in the image and replaced textures is established via a space transformation of the 3D model. This may ensure that replaced textures are consistent with human poses. During user photographing, the system may automatically estimate human poses in the current image, and the user may circle or click regions where textures need to be replaced. The system may automatically separate the selected regions and map the regions to the 3D model of the human body, and also map the regions to corresponding regions covered by the textured image according to the result of parameterization of the 3D model.

Figure 19:
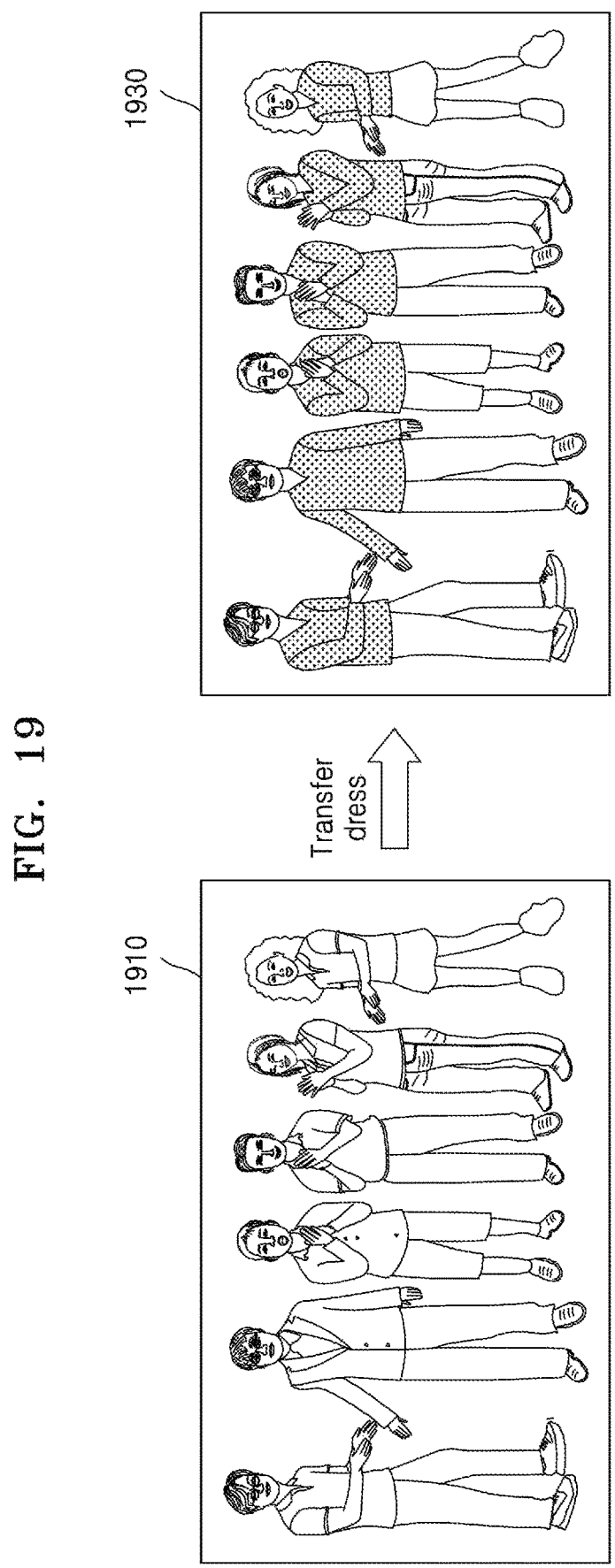
FIG. 19 illustrates an example of texture replacement according to an embodiment of the disclosure.

FIG. 19 illustrates texture replacement according to embodiments of the disclosure.

Referring to FIG. 19, people in the first image 1910 wear different clothes but the clothes of the people in the second image 1930 are unified after texture replacement.

Figure 20:
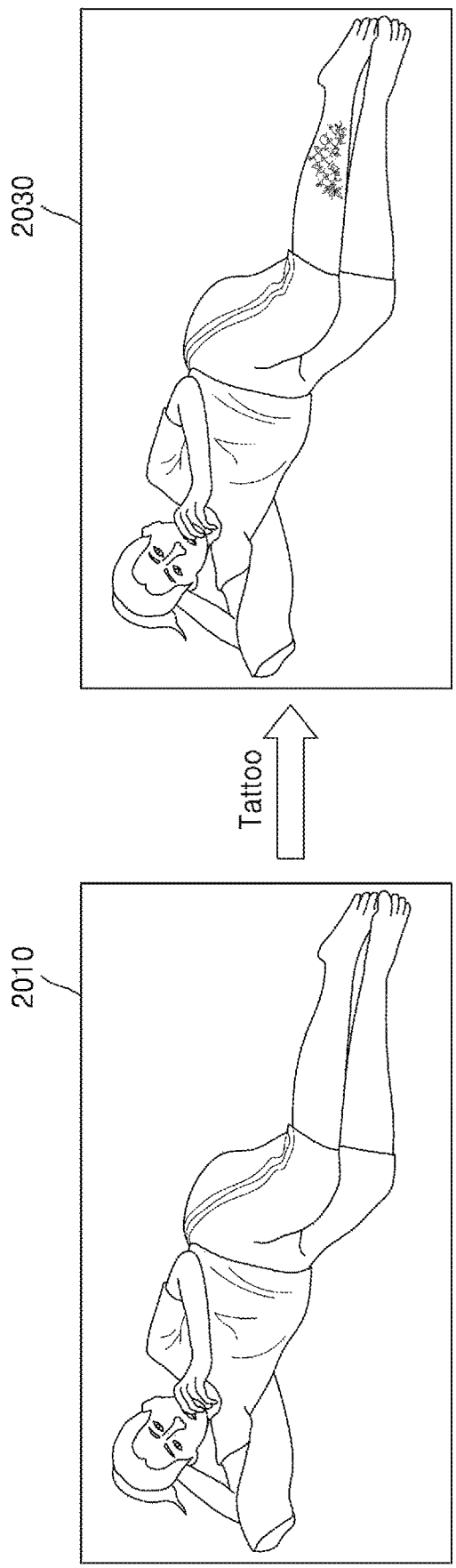
FIG. 20 illustrates an example of texture replacement according to an embodiment of the disclosure.

FIG. 20 illustrates texture replacement according to embodiments of the disclosure. Referring to FIG. 20, images may be processed so that tattoos are drawn on human legs according to the texture replacement.

b. Interaction of persons with virtual items

According to the human pose estimation result, interactions with virtual items may be implemented in the 3D model space. The virtual items may be made to interact better with persons in the real image. Interactions of persons with virtual items may be implemented in a photo containing both persons and AR items (corresponding to content adjustment based on virtual information) by adding decorations to human bodies in the image (corresponding to content adding) and removing some items in contact with human bodies in the image (corresponding to content deletion).

Specifically, when the user wants to take a photo containing both persons and AR items, the user may select existing or designated AR items in the system. The system may realize interactions between AR items and the model of the human bodies in the 3D space and calculate the deformation at the surface where AR items contact with of the human bodies, to change corresponding regions in the image.

FIG. 21 illustrates an example of a virtual item interaction according to an embodiment of the disclosure. Referring to FIG. 21, the user may select a necklace as a virtual item to be added around the neck of the object in the second image 2130.

The foregoing descriptions are implementation solutions of the intelligent processing system in the disclosure. In an embodiment of the disclosure, it is unnecessary to detect an object in the image by face detection so that the object may be accurately detected even though the face is blocked in the image or the object is far away from the photographing device. In the case of multi-person capturing, the system automatically detects whether there is a blocking in the image and whether the gestures of the multiple persons are consistent. Thus, the user does not need to check the blocking or gesture one by one. Also, the system may be set to automatically capture an image. This greatly saves the time for photographing by the user, and the user may capture wonderful moments even though he/she does not have very high photographing skills. Also, the user may receive pose adjustment advice and automatic correction may be performed on the image. Therefore, the user may conveniently capture desired images. Thus, the user is provided with more intelligent functions so that the user may enjoy the advantages of intelligent operations such as sport pose estimation, skin changing, clothes changing, taking photos containing both persons and AR items during the image capturing, etc.

In the embodiments of the disclosure, after the bone nodes are estimated, human surface information may be obtained by regression. The human surface information is different from pose information and is finer and denser information. Flexible transformation of human surface textures is performed based on the human surface information. If the human surface information is applied to virtual fitting scenes, the scenes may be more realistic and the user experience may be enhanced. In addition, the human surface information may also be applied to scenes such as AR scenes and photo beautification.

Figure 22:
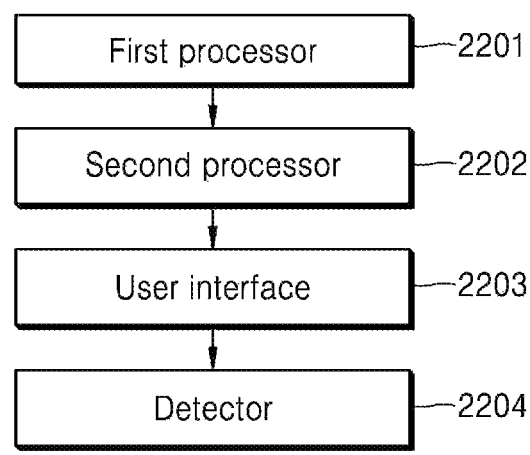
FIG. 22 illustrates a processing device operating based on pose estimation according to an embodiment.

FIG. 22 illustrates a processing device operating based on pose estimation according to an embodiment.

Based on the processing method based on pose estimation according to an embodiment of the disclosure, the disclosure further provides a processing device based on pose estimation, referring to FIG. 22. The processing device may include a first processor 2201 used for performing pose estimation with respect to an object in an image to obtain skeleton information of the object and a second processor 2202 for performing corresponding processing based on the skeleton information of the object.

The first processor 2201 may extract via a feature extraction neural network, features from the image, detect via a backend prediction neural network and according to the extracted features, key point information of the object and generate based on the detected key point information, the skeleton information of the object. The first processor 2201 and the second processor 2202 may be implemented as one hardware processor.

The corresponding processing performed by the second processing unit 2202 may include at least one of blocking detection, pose detection, and content adjustment. The second processor 2202 may determine, according to bone nodes corresponding to the object, blocking of the object, and/or acquire skeleton parts to be detected corresponding to the object, and determine blocking of the skeleton parts according to bone nodes corresponding to the skeleton parts to be detected. The second processor 2202 may determine, according to the number of bone nodes corresponding to the object, the blocking of the object. The second processor 2202 may select the skeleton parts to be detected from skeleton parts corresponding to the object, according to at least one of scene information corresponding to the image, user settings, or apparatus status information. The second processor 2202 may determine, according to a set skeleton part detection order and for bone nodes corresponding to each skeleton part to be detected, blocking of each skeleton part to be detected.

The processing device may include a user interface 2203 for outputting, based on the detected blocking, a blocking warning or a blocking notification. The outputting of a blocking warning, by the user interface 2203, may include at least one of outputting a blocking warning when the number of skeleton parts which achieve a set blocking degree reaches a set threshold of the number of skeleton parts, or outputting a blocking warning when a blocking degree of a set skeleton part achieves a set blocking degree.

The skeleton parts include at least one of an eye skeleton part, an ear skeleton part, a nose skeleton part, a shoulder skeleton part, an elbow skeleton part, a wrist skeleton part, a waist skeleton part, a knee skeleton part or an ankle skeleton part, wherein each of the skeleton parts corresponds to at least one bone node.

The second processor 2202 may perform, according to a positional relationship between bone nodes in the skeleton information, pose detection with the object.

The pose detection performed by the second processing unit 2202 includes at least one of detecting, according to a positional relationship between bone nodes of the shoulder skeleton part, whether the shoulders of the object are aligned, detecting, according to a positional relationship between bone nodes in the eye skeleton part and bone nodes in the shoulder skeleton part, whether the head of the object is in a regular pose, detecting, according to a positional relationship between bone nodes in the nose skeleton part and bone nodes in the shoulder skeleton part, whether the face of the object is in a regular pose, or detecting, according to a positional relationship between bone nodes in the eye skeleton part and bone nodes in the nose skeleton part, whether the head of the object is in a regular pose.

The user interface 2203 may further output, based on a pose detection result, a pose correction warning, and/or correct, based on the pose detection result, the pose of the object.

The second processor 2202 may perform, based on the skeleton information of the object and skeleton information of an associated object associated with the object, pose consistency detection with respect to the object and the associated object. The second processor 2202 may acquire bone node vectors of the object and bone nodes of the associated object, determine similarity between the bone node vectors corresponding to the object and the associated object, determine, based on the similarity between the bone node vectors, pose similarity between the object and the associated object, and detect, according to the pose similarity, pose consistency between the object and the associated object.

The detector 2204 may perform, with respect to a video segment to which the image belongs and according to a pose consistency detection result between the object and the associated object in each image in the video segment, pose consistency detection with respect to the object and the associated object.

The user interface 2203 may further photograph an image and/or output pose adjustment information based on the pose detection result. The second processor 2202 may perform content replacement, content adding, content deletion, and content adjustment based on virtual information.

Figure 23:
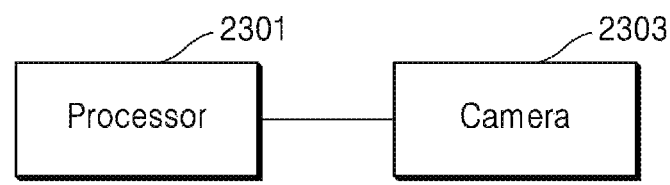
FIG. 23 illustrates an electronic apparatus according to an embodiment.

FIG. 23 illustrates an electronic apparatus according to an embodiment

Based on the method for estimating a pose according to the embodiments of the disclosure, referring to FIG. 23, the disclosure further provides an electronic device, including a processor 2301 and a camera 2303.

The camera 2303 may capture an image containing at least one object such as a human body.

The processor 2301 may execute computer-readable instructions for estimating a pose of the at least one object in the image. The processor 2301 by executing the computer-readable instruction, may estimate poses of the at least one object included in the captured image, obtain skeleton information of the at least one object based on the estimated poses thereof, and process the skeleton information of the at least one object for at least one of detecting blocking of the object, detecting the poses of the object, and/or adjusting content based on detected virtual object distinct from human body poses.

According to the disclosure, not only high-accuracy pose information estimation with respect to objects in images is achieved, but also the network structure is simplified by adjusting the hierarchical structure of a feature extraction neural network. Also, while the high-accuracy of pose information estimation with respect to various objects in images is ensured, the overall computational amount is reduced. Also, by adjusting the network structure of a backend prediction neural network, redundant channels are removed, and thus the processing speed of the backend prediction neural network is increased. Further, by adjusting two sub-networks of the neural network (i.e., the feature extraction neural network and the backend prediction neural network), a lightweight network is realized, so that high-accuracy estimation may be performed based on image pose information by a terminal device with limited computing capacity.

It should be understood by those skilled in the art that computer program instructions may be used to realize each block in structure diagrams and/or block diagrams and/or flowcharts as well as a combination of blocks in the structure diagrams and/or block diagrams and/or flowcharts. Also, it should be understood by those skilled in the art that these computer program instructions may be provided to general purpose computers, special purpose computers or other processors of programmable data processing means to be implemented, so that solutions designated in a block or blocks of the structure diagrams and/or block diagrams and/or flow diagrams are executed by computers or other processors of programmable data processing means.

The modules in the devices of the disclosure may be integrated together, or may be separated from each other. The modules may be integrated into one module, or may be further split into multiple sub-modules.

It should be understood by those skilled in the art that the drawings are merely schematic diagrams of several embodiments of the disclosure, and the modules or diagram flows in the drawings are not necessary for the implementation of the disclosure.

It should be understood by those skilled in the art that the modules in the devices in the embodiments of the disclosure may be distributed in the devices according to the descriptions in the embodiments, or may be located in one or more devices in the embodiments in accordance with corresponding changes. The modules in the embodiments may be integrated into one module, or may be further split into multiple sub-modules.

In addition, all serial numbers in the disclosure are merely for description and do not indicate any preference or technical superiority of the embodiments.

The foregoing description merely discloses several embodiments of the disclosure, and the disclosure is not limited thereto. Any variation conceived by those skilled in the art shall fall into the protection scope of the disclosure as described in the appended claims.

What is claimed is:

1. A method for pose estimation in a device, the method comprising:
digitally capturing an image;
estimating poses of an object included in the digitally captured image;
obtaining skeleton information of the object based on the estimating of the poses of the object, the skeletal information comprising two bone nodes and a vector perpendicular to a line between bone nodes; and
adjusting a pose of the object to align the skeleton information with a predetermined axis by aligning the vector with the predetermined axis.

2. The method of claim 1, wherein the capturing of the image comprises capturing the image in a preview state.

3. The method of claim 1, wherein the estimating of the poses of the object comprises:
extracting features from the digitally captured image;
detecting, based on the extracted features, key point information of the object; and
constructing the skeleton information of the object based on the key point information.

4. The method of claim 1, further comprising processing the skeleton information of the object for detecting blocking of the object by:
determining, according to bone nodes corresponding to the object, at least one missing skeleton part based on the skeleton information; and
obtaining the at least one missing skeleton part, wherein the at least one missing skeleton part corresponds to one of bone nodes.

5. The method of claim 4, wherein the determining of the at least one missing skeleton part comprises determining, according to a number of bone nodes corresponding to the object, the blocking of the object.

6. The method of claim 4, further comprising:
outputting a blocking notification based on the detecting of the blocking.

7. The method of claim 6, wherein the outputting of the blocking notification comprises outputting the blocking notification when the number of the at least one missing skeleton part is greater than a predetermined number.

8. The method of claim 1, further comprising processing the skeleton information of the object for detecting poses of the object by detecting the poses of the object based on a positional relation between bone nodes included in the skeleton information.

9. The method of claim 8, further comprising:
outputting, based on the detecting of the poses of the object, a pose correction notification.

10. The method of claim 1, further comprising processing the skeleton information of the object for detecting poses of the object by:
  detecting pose inconsistency based on the skeleton information of the object; and
  outputting, based on the detecting of the pose inconsistency, a pose inconsistency notification.

11. The method of claim 10, wherein the object is a first object and wherein the detecting of the poses inconsistency comprises:
  obtaining first bone node vectors of the first object and second bone node vectors of a second object;
  determining a degree of a pose similarity between the first bone vector and the second bone node vector; and
  detecting the pose inconsistency between the first object and the second object based on the degree of the pose similarity between the first bone vector and the second bone node vector.

12. The method of claim 11, wherein the detecting of the pose inconsistency further comprises adjusting the poses of the first object to poses of the second object based on the detecting of the poses inconsistency.

13. The method of claim 1, further comprising processing the skeleton information of the object for adjusting the content based on detected virtual object distinct from human body poses by performing at least one of content replacement, content adding, content deletion and content adjustment based on the detected virtual object.

14. The method of claim 1, wherein adjusting the pose of the object comprises:
  generating a 3D model of the object based on the skeletal information;
  adjusting the 3D model to align the skeletal information with a predetermined axis; and
  mapping the adjusted 3D model to a corresponding region in the digitally captured image.

15. A method for estimating a pose of an object, the method comprising:
  extracting, by a feature extraction neural network, features from an image containing the object;
  detecting, by a backend prediction neural network, key point information of the object based on the features; and
  constructing skeleton information of the object based on the key point information,
  wherein the key point information of the object comprises bone node information and bone node vector information of the object, and
  wherein the detecting of the key point information comprises detecting, by the backend prediction neural network, the bone node information and the bone node vector information of the object.

16. The method of claim 15, wherein a number of convolution layers included in at least one bottleneck unit in the feature extraction neural network is less than a predetermined number of second target convolution layers, a number of Batch Normalization (BN) layers in the at least one bottleneck unit is less than a predetermined number of target BN layers, or no predetermined convolution layer is included in the at least one bottleneck unit.

17. The method of claim 15, wherein a number of channels of the backend prediction neural network is less than a predetermined number of channels.

18. The method of claim 17, further comprising:
  obtaining the backend prediction neural network, and
  wherein the obtaining of the backend prediction neural network comprises:
    selecting at least one channel to be pruned from the channels of the backend prediction neural network based on a pixel variance of each of the channels of the backend prediction neural network;
    pruning the at least one channel from the channels of the backend prediction neural network;
    adjusting the backend prediction neural network based on the pruning; and
    detecting, by the adjusted backend prediction neural network, the key point information of the object.

19. The method of claim 18, wherein the obtaining of the backend prediction neural network further comprises:
  repeating the selecting the at least one channel, the pruning the at least one channel, the adjusting the backend prediction neural network, and the detecting the key point information of the object until the number of the channels of the backend prediction neural network equals the predetermined number of channels.

20. The apparatus of claim 15, wherein adjusting the pose of the object comprises:
  generating a 3D model of the object based on the skeletal information;
  adjusting the 3D model to align the skeletal information with a predetermined axis; and
  mapping the adjusted 3D model to a corresponding region in the digitally captured image.

21. An apparatus for estimating a pose of an object, the apparatus comprising:
  a camera for capturing an image; and
  a processor configured to:
    estimate poses of an object included in the captured image,
    obtain skeleton information of the object based on the estimating of the poses of the object, the skeletal information comprising two bone nodes and a vector perpendicular to a line between bone nodes, and
    adjusting a pose of the object to align the skeleton information with a predetermined axis by aligning the vector with the predetermined axis.

* * * * *